(12) United States Patent
Fukuda

(10) Patent No.: US 12,291,849 B2
(45) Date of Patent: May 6, 2025

(54) HYDRAULIC SYSTEM IN WORK MACHINE

(71) Applicant: Kubota Corporation, Osaka (JP)

(72) Inventor: Yuji Fukuda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 161 days.

(21) Appl. No.: 17/667,539

(22) Filed: Feb. 9, 2022

(65) Prior Publication Data

US 2022/0154428 A1 May 19, 2022

Related U.S. Application Data

(62) Division of application No. 16/851,102, filed on Apr. 17, 2020, now Pat. No. 11,280,064, which is a
(Continued)

(30) Foreign Application Priority Data

Oct. 3, 2017 (JP) ................................ 2017-193603
Oct. 3, 2017 (JP) ................................ 2017-193604

(51) Int. Cl.
*E02F 9/22* (2006.01)
*F15B 13/042* (2006.01)
(Continued)

(52) U.S. Cl.
CPC .......... *E02F 9/2267* (2013.01); *E02F 9/2285* (2013.01); *E02F 9/2292* (2013.01);
(Continued)

(58) Field of Classification Search
CPC ................. F16H 61/431; F16H 61/433; F15B 2211/20553; F04B 49/002; F04B 49/08
See application file for complete search history.

(56) References Cited

U.S. PATENT DOCUMENTS 3,200,666 A 8/1965 Schrodt et al.
3,807,174 A 4/1974 Wagenseil et al.
(Continued)

FOREIGN PATENT DOCUMENTS

JP 08-189502 7/1996
JP 09-235756 9/1997
(Continued)

OTHER PUBLICATIONS

Restriction requirement issued by the U.S. Patent and Trademark Office for the U.S. Appl. No. 16/012,761, filed Aug. 19, 2019.
(Continued)

*Primary Examiner* — Kenneth Bomberg
*Assistant Examiner* — Michael Quandt
(74) *Attorney, Agent, or Firm* — MORI & WARD, LLP

(57) ABSTRACT

A hydraulic system in a work machine includes a travel operation device provided in a pilot oil path between a hydraulic pump a travel pump and including an operation member and configured to generate a pilot pressure supplied via the pilot oil path and an additional pilot pressure in accordance with an operation amount of the operation member. The travel pump is to control a flow direction of hydraulic oil supplied to a travel motor based on the pilot pressure and the additional pilot pressure. A pressure selection valve is provided in a first coupling oil path to select a selected pressure from the pilot pressure and the additional pilot pressure to apply the selected pressure to the pilot hydraulic oil in the second coupling oil path. A pressure adjustment valve is provided in a second coupling oil path to control the selected pressure to be an adjusted pilot pressure.

20 Claims, 9 Drawing Sheets

Related U.S. Application Data division of application No. 16/012,761, filed on Jun. 20, 2018, now Pat. No. 10,662,980.

(51) Int. Cl.

| | | |
|---|---|---|
| *F15B 15/18* | (2006.01) | |
| *F15B 20/00* | (2006.01) | |
| *F16H 61/433* | (2010.01) | |
| *F16H 61/478* | (2010.01) | |

(52) U.S. Cl.
CPC .......... *F15B 13/0422* (2013.01); *F15B 15/18* (2013.01); *F15B 20/007* (2013.01); *F15B 2211/205* (2013.01); *F15B 2211/355* (2013.01); *F15B 2211/50572* (2013.01); *F15B 2211/55* (2013.01); *F15B 2211/575* (2013.01); *F15B 2211/6355* (2013.01); *F15B 2211/67* (2013.01); *F16H 61/433* (2013.01); *F16H 61/478* (2013.01)

(56) References Cited

U.S. PATENT DOCUMENTS

| | | | | |
|---|---|---|---|---|
| 3,881,317 | A * | 5/1975 | Swoager | F16H 61/46 60/452 |
| 4,400,939 | A * | 8/1983 | Moranduzzo | F16H 61/42 60/444 |
| 4,773,217 | A * | 9/1988 | Angot | E02F 9/2004 60/444 |
| 6,082,107 | A | 7/2000 | Schniederjan et al. | |
| 6,789,412 | B2 * | 9/2004 | Mototani | F15B 13/0422 73/114.57 |
| 8,495,870 | B2 * | 7/2013 | Sumiyoshi | F16H 61/433 60/445 |
| 9,316,310 | B2 | 4/2016 | Kinugawa et al. | |

FOREIGN PATENT DOCUMENTS

| | | |
|---|---|---|
| JP | 5687970 B2 | 2/2013 |
| JP | 2017-067100 | 4/2017 |
| JP | 2017-518213 | 7/2017 |

OTHER PUBLICATIONS

Office Action with Form PTO-892 Notice of References Cited issued by the U.S. Patent and Trademark Office for the U.S. Appl. No. 16/012,761, filed Nov. 22, 2019.

Notice of Allowance issued by the United States Patent and Trademark Office for the U.S. Appl. No. 16/012,761, filed Mar. 26, 2020.

Japanese Office Action for corresponding JP Application No. 2017-193603, Sep. 24, 2020 (w/ machine translation).

Japanese Office Action for corresponding JP Application No. 2017-193604, Oct. 8, 2020 (w/ machine translation).

Office Action with Form PTO-892 Notice of References Cited issued by the U.S. Patent and Trademark Office for the parent U.S. Appl. No. 16/851,102, Jul. 12, 2021.

Notice of Allowance issued by the United States Patent and Trademark Office for the parent U.S. Appl. No. 16/851,102, Dec. 15, 2021.

* cited by examiner

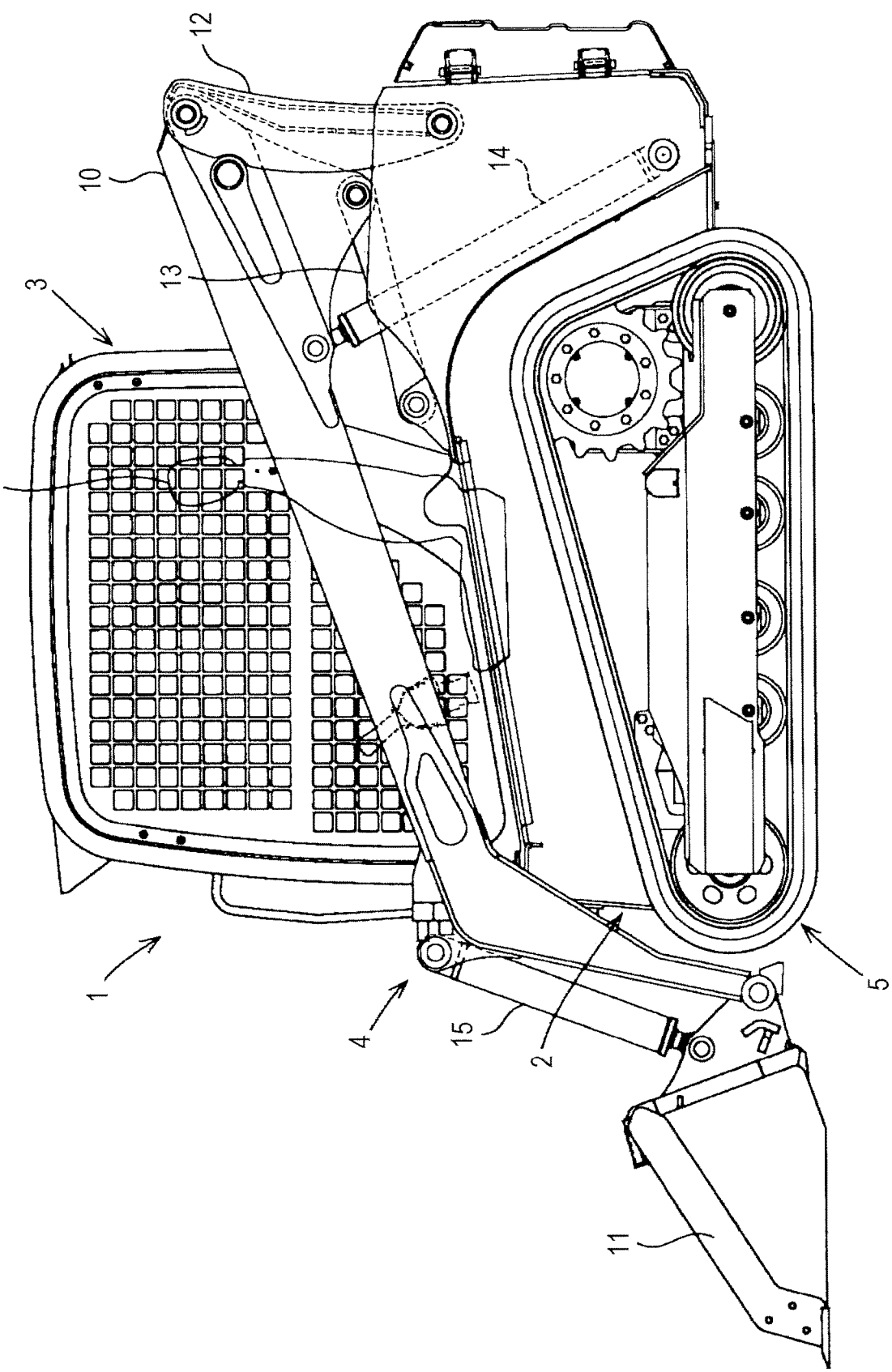

HYDRAULIC SYSTEM IN WORK MACHINE

CROSS-REFERENCE TO RELATED APPLICATIONS

The present application is a divisional application of the U.S. patent application Ser. No. 16/851,102 filed Apr. 17, 2020, which is a divisional application of the U.S. patent application Ser. No. 16/012,761 filed Jun. 20, 2018, which was issued as the U.S. Pat. No. 10,662,980, which claims priority under 35 U.S.C. § 119 to Japanese Patent Application No. 2017-193603, filed Oct. 3, 2017, and Japanese Patent Application No. 2017-193604, filed Oct. 3, 2017. The contents of these applications are incorporated herein by reference in their entirety.

BACKGROUND OF THE INVENTION

Field of the Invention

The present invention relates to a hydraulic system in a work machine.

Discussion of the Background

In the conventional work machine, for example, the output of a hydraulic instrument needs to be reduced because of various reasons. For example, in the disclosure of Japanese Patent No. 5687970, when an engine receives a load equal to or larger than a predetermined load, the output of a travel pump that is a hydraulic instrument is reduced. Specifically, a work machine disclosed in Japanese Patent No. 5687970 includes an engine, a travel pump driven by the engine, a travel operation lever, an operation valve capable of changing the pressure (pilot pressure) of pilot oil in accordance with an operation on the travel operation lever, and a pressure control valve provided upstream relative to the operation valve.

SUMMARY OF THE INVENTION

According to one aspect of the present invention, a hydraulic system in a work machine includes a travel motor, a travel pump, a hydraulic pump, a pilot oil path, a travel operation device, an additional pilot oil path, a drain oil path, a pressure selection valve, and a pressure adjustment valve. The travel motor is to be driven by hydraulic oil to rotate a drive shaft of a travel machine of the work machine. The travel pump is to supply the hydraulic oil to the travel motor to drive the travel motor. The hydraulic pump is to supply pilot hydraulic oil. The pilot oil path connects the hydraulic pump and the travel pump to supply the pilot hydraulic oil to the travel pump. The travel operation device is provided in the pilot oil path between the hydraulic pump and the travel pump and includes an operation member. The travel operation device is configured to generate a pilot pressure and an additional pilot pressure in accordance with an operation amount of the operation member. The pilot pressure is supplied via the pilot oil path. The additional pilot oil path connects the travel operation device and the travel pump to supply the additional pilot pressure to the travel pump. The travel pump is configured to control a flow direction of the hydraulic oil supplied to the travel motor based on the pilot pressure and the additional pilot pressure. The drain oil path is divided from the pilot oil path. The drain oil path includes a first coupling oil path connecting the pilot oil path and the additional pilot oil path and a second coupling oil path divided from the first coupling oil path. The pressure selection valve is provided in the first coupling oil path to select a selected pressure of the pilot hydraulic oil from the pilot pressure and the additional pilot pressure to apply the selected pressure to the pilot hydraulic oil in the second coupling oil path. The pressure adjustment valve is provided in the second coupling oil path and is configured to control the selected pressure to be an adjusted pilot pressure.

According to another aspect of the present invention, a hydraulic system in a work machine includes a travel motor, a travel pump, a hydraulic pump, a pilot oil path, a travel operation device, an additional pilot oil path, a drain oil path, a first check valve, a second check valve, and a pressure adjustment valve. The travel motor is to be driven by hydraulic oil to rotate a drive shaft of a travel machine of the work machine. The travel pump is to supply the hydraulic oil to the travel motor to drive the travel motor. The pilot oil path connects the hydraulic pump and the travel pump to supply the pilot hydraulic oil to the travel pump. The travel operation device is provided in the pilot oil path between the hydraulic pump and the travel pump and includes an operation member. The travel operation device is configured to generate a pilot pressure and an additional pilot pressure in accordance with an operation amount of the operation member. The pilot pressure is supplied via the pilot oil path. The additional pilot oil path connects the travel operation device and the travel pump to supply the additional pilot pressure to the travel pump. The travel pump is configured to control a flow direction of the hydraulic oil supplied to the travel motor based on the pilot pressure and the additional pilot pressure. The drain oil path is divided from the pilot oil path. The drain oil path includes a first coupling oil path connecting the pilot oil path and the additional pilot oil path and a second coupling oil path divided from the first coupling oil path. The first check valve is provided in the first coupling oil path to be opened such that the pilot hydraulic oil flows from the pilot oil path to the second coupling oil path and to be closed such that the pilot hydraulic oil does not flow from the second coupling oil path to the pilot oil path. The second check valve is provided in the first coupling oil path to be opened such that the hydraulic oil flows from the additional pilot oil path to the second coupling oil path and to be closed such that the pilot hydraulic oil does not flow from the second coupling oil path to the additional pilot oil path. The pressure adjustment valve is provided in the second coupling oil path and is configured to control the pilot pressure and the additional pilot pressure to be an adjusted pilot pressure.

According to further aspect of the present invention, a hydraulic system in a work machine includes a travel motor, a travel pump, a hydraulic pump, a pilot oil path, a travel operation device, an additional pilot oil path, a pressure adjustment valve, and an additional pressure adjustment valve. The travel motor is to be driven by hydraulic oil to rotate a drive shaft of a travel machine of the work machine. The travel pump is to supply the hydraulic oil to the travel motor to drive the travel motor. The pilot oil path connects the hydraulic pump and the travel pump to supply the pilot hydraulic oil to the travel pump. The travel operation device is provided in the pilot oil path between the hydraulic pump and the travel pump and includes an operation member. The travel operation device is configured to generate a pilot pressure and an additional pilot pressure in accordance with an operation amount of the operation member. The pilot pressure is supplied via the pilot oil path. The additional pilot oil path connects the travel operation device and the travel pump to supply the additional pilot pressure to the travel pump. The travel pump is configured to control a flow direction of the hydraulic oil supplied to the travel motor based on the pilot pressure and the additional pilot pressure. The pressure adjustment valve is connected to the pilot oil path between the travel operation device and the travel pump to control the pilot pressure to be an adjusted pilot pressure. The additional pressure adjustment valve is connected to the additional pilot oil path between the travel operation device and the travel pump to control the additional pilot pressure to be an adjusted additional pilot pressure.

According to further aspect of the present invention, a hydraulic system in a work machine includes a travel motor, a travel pump, a hydraulic pump, a pilot oil path, a travel operation device, and a pressure adjustment valve. The travel motor is to be driven by hydraulic oil to rotate a drive shaft of a travel machine of the work machine. The travel pump is to supply the hydraulic oil to the travel motor to drive the travel motor. The hydraulic pump is to supply pilot hydraulic oil. The pilot oil path connects the hydraulic pump and the travel pump to supply the pilot hydraulic oil to the travel pump. The travel operation device is provided in the pilot oil path between the hydraulic pump and the travel pump and includes an operation member. The travel operation device is configured to generate a pilot pressure in accordance with an operation amount of the operation member. The pilot pressure is supplied to the travel pump via the pilot oil path. The pressure adjustment valve is connected to the pilot oil path between the travel operation device and the travel pump to control the pilot pressure to be an adjusted pilot pressure. The pressure adjustment valve includes a variable throttle valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a side view of a track loader that is an example of a work machine.

DESCRIPTION OF THE EMBODIMENTS

Figure 1:
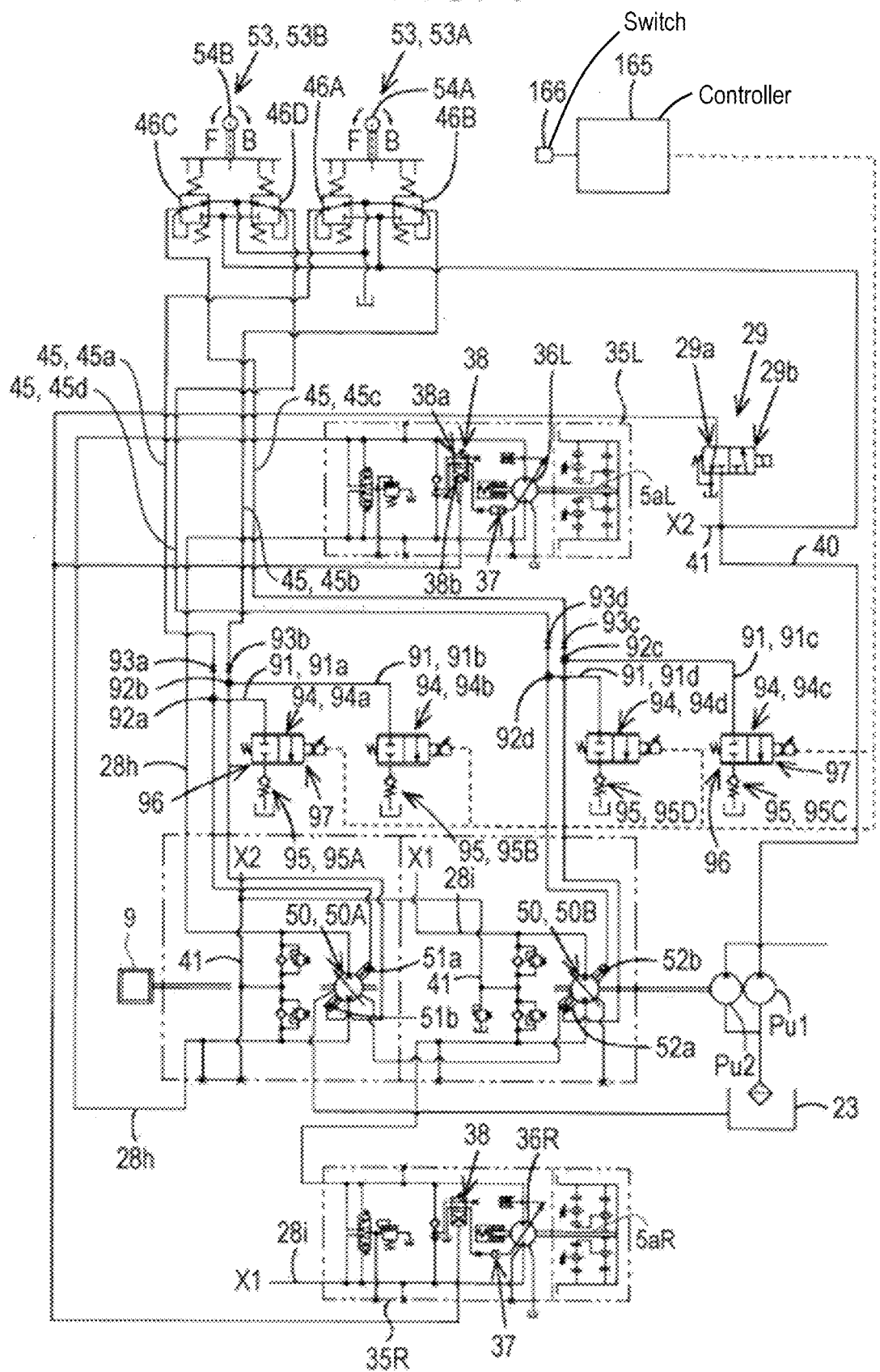
FIG. 1 is a view of a hydraulic system of a traveling system.

The embodiments will now be described with reference to the accompanying drawings, wherein like reference numerals designate corresponding or identical elements throughout the various drawings.

Embodiments which are examples of the present invention will be described below with reference to the drawings.

FIG. 4 shows a side view of a work machine according to the embodiment of the present invention. FIG. 4 illustrates a compact track loader as an exemplary work machine. However, the work machine according to the embodiment of the present invention is not limited to a compact track loader, but may be, for example, another kind of loader work machine such as a skid steer loader. Alternatively, the work machine may be a work machine other than a loader work machine.

As illustrated in FIG. 4, a work machine 1 includes a machine body 2, a cabin 3, a work device 4, and travel devices 5. In the embodiments of the present invention, it is assumed that a front side (left side in FIG. 4) of a driver sitting on a driver's seat 8 of the work machine 1 is a forward direction, a back side (right side in FIG. 4) of the driver is a backward direction, a left side (near side in FIG. 4) of the driver is a leftward direction, and a right side (far side in FIG. 4) of the driver is a rightward direction. Furthermore, it is assumed that a horizontal direction that is orthogonal to the forward and backward directions is a machine body width direction. Furthermore, it is assumed that a rightward or leftward direction from a central part of the machine body 2 is a machine body outward direction. In other words, the machine body outward direction is the machine body width direction and is a direction away from the machine body 2. Furthermore, it is assumed that a direction opposite to the machine body outward direction is a machine body inward direction. In other words, the body inward direction is a direction toward the machine body 2 along the body width direction.

The cabin 3 is mounted on the machine body 2. The cabin 3 is provided with the driver's seat 8. The work device 4 is mounted on the machine body 2. The travel devices 5 are provided outside of the machine body 2. An engine 9 (See FIG. 2) is mounted on a back part in the machine body 2.

The work device 4 includes booms 10, a work tool 11, lift links 12, control links 13, boom cylinders 14, and bucket cylinders 15.

The booms 10 are provided swingably in the vertical direction on the right side and the left side of the cabin 3. The work tool 11 is, for example, a bucket, and the bucket 11 is provided to leading end parts (front end parts) of the booms 10 to be swingable in the vertical direction. The lift links 12 and the control links 13 support base parts (back parts) of the booms 10 so that the booms 10 are swingable in the vertical direction. The boom cylinders 14 extend and contract to lift and lower the booms 10. The bucket cylinders 15 extend and contract to swing the bucket 11.

Front parts of the booms 10 on the left side and the right side are coupled with each other through a curved and forked coupling pipe. The base parts (back parts) of the booms 10 are coupled with each other through a circular coupling pipe.

The lift links 12, the control links 13, and the boom cylinders 14 are provided on the left side and the right side of the machine body 2 in a manner corresponding to the booms 10 on the left side and the right side.

The lift links 12 are vertically provided to back parts of the base parts of the booms 10. Upper parts (one end side) of the lift links 12 are pivoted rotatably about the horizontal axis closer to the back parts of the base parts of the booms 10 through a pivotal shaft. Lower parts (other end side) of the lift links 12 are pivoted rotatably about the horizontal axis closer to the back part of the machine body 2 through a pivotal shaft.

Upper parts of the boom cylinders 14 are pivoted rotatably about the horizontal axis through a pivotal shaft. Lower parts of the boom cylinders 14 are pivoted rotatably about the horizontal axis through a pivotal shaft.

The control links 13 are provided in front of the lift links 12. One ends of the control links 13 are pivoted rotatably about the horizontal axis through a pivotal shaft. The other ends of the control links 13 are pivoted rotatably about the horizontal axis through a pivotal shaft.

The booms 10 vertically swing about the pivotal shaft through expansion and contraction of the boom cylinders 14 while the base parts of the booms 10 are supported by the lift links 12 and the control links 13, and the leading end parts of the booms 10 move up and down. The control links 13 vertically swing about the pivotal shaft along with the vertical swing of the booms 10. The lift links 12 swing in the front-back direction about the pivotal shaft along with the vertical swing of the control links 13.

Instead of the bucket 11, another work tool is attachable to the front parts of the booms 10. Examples of the other work tool include attachments (auxiliary attachments) such as a hydraulic crusher, a hydraulic breaker, an angle broom, an earth auger, a pallet folk, a sweeper, a mower, and a snow blower.

A connecting member is provided to the front part of the boom 10 on the left side. The connecting member is a device configured to connect a hydraulic instrument provided to an auxiliary attachment, and a first pipe member such as a pipe provided to the boom 10. Specifically, one end of the connecting member is connectable to the first pipe member, and the other end is connectable to a second pipe member connected with the hydraulic instrument of the auxiliary attachment. With this configuration, hydraulic oil flowing through the first pipe member passes through the second pipe member before being supplied to the hydraulic instrument.

The bucket cylinders 15 are arranged closer to the front parts of the booms 10. The bucket 11 is swung through expansion and contraction of the bucket cylinders 15.

The travel devices 5 on the left side and the right side are crawler travel devices (including semi-crawler travel devices) in the present embodiment. The travel devices 5 may be wheeled travel devices provided with front and rear wheels.

As illustrated in FIG. 1, the hydraulic system includes a first hydraulic pump Pu1 and a second hydraulic pump Pu2. The first hydraulic pump Pu1 is used to drive a hydraulic actuator of the boom cylinders 14, the bucket cylinders 15, or an attachment attached to leading ends of the booms 22. The second hydraulic pump Pu2 (pilot pump) is mainly used to supply pressure of the hydraulic oil, which is to be used as control pressure or signal pressure. Hereinafter, for descriptive purposes, the hydraulic oil for supplying control pressure or signal pressure will be referred to as "pilot oil", while pressure of the pilot oil will be referred to as "pilot pressure".

As illustrated in FIG. 1, a hydraulic system of a traveling system is a system configured to drive the travel devices 5.

The symbols "X1" and "X2" illustrated in FIG. 1 denote targets to be coupled to oil paths.

The travel devices 5 include a first travel motor device 35L and a second travel motor device 35R.

A supply oil path 40 is provided to the first hydraulic pump Pu1 so that the hydraulic oil (pilot oil) flows therethrough. The supply oil path 40 is provided with a direction switching valve 29, the first travel motor device 35L, and the second travel motor device 35R. The supply oil path 40 is further provided with a charge oil path 41.

The direction switching valve 29 is an electromagnetic valve configured to change rotation of the first travel motor device 35L and the second travel motor device 35R, and is a two-position switching valve switchable between a first position 29a and a second position 29b through excitation. A switching operation of the direction switching valve 29 is performed by, for example, an operation member (not illustrated).

The first travel motor device 35L is a device configured to transfer power to a drive shaft (a shaft) 5aL of the travel device 5 provided on the left side of the machine body 2. The second travel motor device 35R is a device configured to transfer power to a drive shaft (a shaft) 5aR of the travel device provided on the right side of the machine body 2.

The first travel motor device 35L includes a travel motor 36L, a swash plate switching cylinder 37, and a travel control valve (hydraulic switching valve) 38. The travel motor 36L is a swash-plate variable-displacement axial motor capable of changing a vehicle speed (rotation) to the first or second speed. In other words, the travel motor 36L is a motor capable of changing a driving force of the work machine 1.

The swash plate switching cylinder 37 is a cylinder configured to change the angle of a swash plate of the travel motor 36L through expansion and contraction. The travel control valve 38 is a valve configured to expand and contract the swash plate switching cylinder 37 toward one end or the other end, and is a two-position switching valve switchable between a first position 38a and a second position 38b. A switching operation of the travel control valve 38 is performed by the direction switching valve 29 connected with the travel control valve 38 and positioned upstream.

As described above, according to the first travel motor device 35L, when the direction switching valve 29 is switched to the first position 29a through an operation of the operation member, the pilot oil is drained from a section between the direction switching valve 29 and the travel control valve 38, and the travel control valve 38 is switched to the first position 38a. As a result, the swash plate switching cylinder 37 is contracted to set the travel motor 36L to the first speed. When the direction switching valve 29 is switched to the second position 29b through an operation of the operation member, the pilot oil is supplied to the travel control valve 38 through the direction switching valve 29, and the travel control valve 38 is switched to the second position 38b. As a result, the swash plate switching cylinder 37 is extended to set the travel motor 36L to the second speed.

The second travel motor device 35R is actuated in a manner similar to that of the first travel motor device 35L. The second travel motor device 35R is configured and actuated in a manner similar to those of the first travel motor device 35L, and thus description thereof will be omitted.

The hydraulic system of the traveling system includes a plurality of travel pumps 50. The travel pumps 50 include a travel pump 50A and a travel pump 50B. The travel pump 50A is configured to control the travel motor 36L in the first travel motor device 35L. The travel pump 50B is configured to control the travel motor 36R in the second travel motor device 35R.

The travel pumps 50A and 50B are swash-plate variable-displacement axial pumps. The travel pump 50A includes a first pressure receiving portion 51a to which the pilot pressure acts, and a second pressure receiving portion 51b to which the pilot pressure also acts. When the pilot pressure acts onto the pressure receiving portions 51a and 51b of the travel pump 50A, the angle of the swash plate of the travel pump 50A changes. Changing the angle of the swash plate can change the outputs (supply amounts of hydraulic oil) of the travel pump 50A and the direction of supplying the hydraulic oil.

The travel pump 50B includes a first pressure receiving portion 52a to which the pilot pressure acts, and a second pressure receiving portion 52b to which the pilot pressure also acts. When the pilot pressure acts onto the pressure receiving portions 52a and 52b of the travel pump 50B, the angle of the swash plate of the travel pump 50B changes. Changing the angle of the swash plate can change the outputs (supply amounts of hydraulic oil) of the travel pump 50B and the direction of supplying the hydraulic oil.

The travel pump 50A and the travel motor 36L are coupled by a speed changing oil path 28h so that the hydraulic oil (pilot oil) supplied from the travel pump 50A is supplied to the travel motor 36L. The travel pump 50B and the travel motor 36R are coupled by a speed changing oil path 28i so that the hydraulic oil (pilot oil) supplied from the travel pump 50B is supplied to the travel motor 36R. The speed changing oil path 28h and the speed changing oil path 28i are coupled to the charge oil path 41 so as to supply the pilot oil to the charge oil path 41.

The hydraulic system of the traveling system includes a plurality of travel operation devices 53. The plurality of travel operation devices 53 are devices configured to respectively operate the plurality of travel pumps 50. When operated, the travel operation devices 53 can respectively set pilot pressure acting onto the pressure receiving portions (first pressure receiving portions 51a and 52a and second pressure receiving portions 51b and 52b) of the travel pumps 50. The plurality of travel operation devices 53 include a travel operation device 53A disposed to the left of the driver's seat 8, and a travel operation device 53B disposed to the right of the driver's seat 8.

The travel operation device 53A includes an operation member 54A, and a plurality of operation valves 46A and 46B. The operation member 54A is formed into a lever, for example, and is configured to swing frontward and backward. The plurality of operation valves 46A and 46B are coupled, via oil paths, to the second hydraulic pump Pu2, and are each configured to set pilot pressure as the operation member 54A is operated.

For example, when the operation member 54A is tilted forward, the operation valve 46A sets pilot pressure acting onto the first pressure receiving portion 51a in accordance with an operation amount of the operation member 54A. When the pilot pressure acting onto the first pressure receiving portion 51a is equal to or above a predetermined value, the angle of the swash plate of the travel pump 50A changes, and the travel pump 50A normal-rotates.

When the operation member 54A is tilted backward, the operation valve 46B sets pilot pressure acting onto the second pressure receiving portion 51b in accordance with an operation amount of the operation member 54A. When the pilot pressure acting onto the second pressure receiving portion 51b is equal to or above a predetermined value, the angle of the swash plate of the travel pump 50A changes, and the travel pump 50A reverse-rotates.

The travel operation device 53B includes an operation member 54B, and a plurality of operation valves 46C and 46D. The operation member 54B is formed into a lever, for example, and is configured to swing forward and backward. The plurality of operation valves 46C and 46D are coupled, via oil paths, to the second hydraulic pump Pu2, and are each configured to set pilot pressure in accordance with an operation of the operation member 54B.

For example, when the operation member 54B is tilted forward, the operation valve 46C sets pilot pressure acting onto the first pressure receiving portion 52a in accordance with an operation amount of the operation member 54B. When the pilot pressure acting onto the first pressure receiving portion 52a is equal to or above a predetermined value, the angle of the swash plate of the travel pump 50B changes, and the travel pump 50B normal-rotates.

When the operation member 54B is tilted backward, the operation valve 46D sets pilot pressure acting onto the second pressure receiving portion 52b in accordance with an operation amount of the operation member 54B. When the pilot pressure acting onto the second pressure receiving portion 52b is equal to or above a predetermined value, the angle of the swash plate of the travel pump 50B changes, and the travel pump 50B reverse-rotates.

The hydraulic system of the traveling system includes a plurality of pilot oil paths 45. The plurality of pilot oil paths 45 are oil paths respectively coupling the travel operation device 53 and the plurality of pressure receiving portions (first pressure receiving portions 51a and 52a and second pressure receiving portions 51b and 52b). Specifically, the plurality of pilot oil paths 45 include a pilot oil path 45a coupling the operation valve 46A and the first pressure receiving portion 51a, a pilot oil path 45b coupling the operation valve 46B and the second pressure receiving portion 51b, a pilot oil path 45c coupling the operation valve 46C and the first pressure receiving portion 52a, and a pilot oil path 45d coupling the operation valve 46D and the second pressure receiving portion 52b.

The hydraulic system of the traveling system includes a plurality of drain oil paths 91. The plurality of drain oil paths 91 are oil paths respectively coupled to the plurality of pilot oil paths 45, and are each configured to drain the pilot oil in the plurality of pilot oil paths 45 to a hydraulic oil tank 23 (a hydraulic oil reservoir 23), for example. Specifically, the plurality of drain oil paths 91 include a drain oil path 91a coupled to the pilot oil path 45a, a drain oil path 91b coupled to the pilot oil path 45b, a drain oil path 91c coupled to the pilot oil path 45c, and a drain oil path 91d coupled to the pilot oil path 45d.

In the plurality of pilot oil paths 45, throttle portions (throttles) 93a, 93b, 93c, and 93d are respectively disposed between the plurality of operation valves 46A, 46B, 46C, and 46D and coupling portions 92a, 92b, 92c, and 92d respectively coupling the plurality of pilot oil paths 45 and the plurality of drain oil paths 91.

The hydraulic system of the traveling system includes a plurality of alteration portions (pressure adjustment valves) 94, and a plurality of differential pressure generation portions (differential pressure generation valves) 95. The plurality of alteration portions 94 are each configured to alter the pilot pressure (secondary pilot pressure) acting onto the pressure receiving portions (first pressure receiving portions 51a and 52a and second pressure receiving portion 51b and 52b) with respect to an operation amount of each of the travel operation devices 53, for example, when a load of the engine 9 is higher than a load threshold. In other words, the plurality of alteration portions 94 are each configured to at least alter an increasing rate (gradient) of the secondary pilot pressure with respect to an operation amount of each of the travel operation devices 53. The plurality of alteration portions 94 may each be configured to alter a decreasing rate (gradient) of the pilot pressure with respect to an operation amount of each of the travel operation devices 53.

The plurality of alteration portions 94 are respectively disposed in the plurality of drain oil paths 91. The plurality of alteration portions 94 include an alteration portion 94a disposed in the drain oil path 91a, an alteration portion 94b disposed in the drain oil path 91a, an alteration portion 94c disposed in the drain oil path 91c, and an alteration portion 94d disposed in the drain oil path 91d.

The alteration portions 94a, 94b, 94c, and 94d are electromagnetic variable throttle valves (electric variable throttle valves). The variable throttle valves are valves each configured to switch between a closed position 96, at which a throttle area is reduced to zero, that is, the path is fully closed, and an open position 97, at which the path is fully open. The variable throttle valves are each configured to set a throttle area at a desired position between the closed position 96 and the open position 97.

A throttle amount of each of the variable throttle valves can be adjusted with a switch 166 disposed on a controller 165, for example. The switch 166 is disposed adjacent to the driver's seat 8 so as to be operated by a driver, for example. For example, the switch 166 is a switch configured to switch between ON and OFF. A signal indicative of ON or OFF of the switch 166 then is input to the controller 165. When the switch 166 is in ON, the pilot pressure in the plurality of pilot oil paths 45 (secondary pilot pressure in the operation valves 46A, 46B, 46C, and 46D) is limited, while, when the switch 166 is in OFF, no secondary pilot pressure is limited. For example, when the switch 166 is in ON, the controller 165 sets throttle amounts for the variable throttle valves so that throttle diameters (throttle areas) of the alteration portions 94 and throttle diameters of the throttle portions 93a, 93b, 93c, and 93d respectively match each other. In other words, the controller 165 receives the operation of the switch 166 (ON) to allow the pressure adjustment valve (e.g., alternation portions 94) to change the selected pressure (e.g., secondary pilot pressure) to the adjusted pilot pressure (e.g., limited secondary pilot pressure) based on the operation of the switch 166. On the other hand, when the switch 166 is in OFF, the controller 165 causes the variable throttle valves to each move to the closed position 96. In other words, the controller 165 receives the operation of the switch 166 (OFF) to disallow the pressure adjustment valve (e.g., alternation portions 94) to change the selected pressure (e.g., secondary pilot pressure) to the adjusted pilot pressure based on the operation of the switch 166. By disposing an alteration operation member 168, which is a rotatable volume or a slide switch, for example, on the controller 165, and by operating the alteration operation member 168, an increasing rate (gradient) of secondary pilot pressure may be altered with respect to an operation amount of each of the travel operation devices 53. The above described throttle amounts set in the variable throttle valves are merely examples. The embodiment of the present invention is not limited to the throttle amounts.

The plurality of differential pressure generation portions 95 are respectively disposed in the plurality of drain oil paths 91. The plurality of differential pressure generation portions 95 are portions each configured to generate differential pressure upstream or downstream relative to the plurality of alteration portions 94.

The plurality of differential pressure generation portions 95 are respectively disposed downstream relative to the plurality of alteration portions 94. The plurality of differential pressure generation portions 95 include a differential pressure generation portion 95A disposed downstream relative to the alteration portion 94a, a differential pressure generation portion 95B disposed downstream relative to the alteration portion 94b, a differential pressure generation portion 95C disposed downstream relative to the alteration portion 94c, and a differential pressure generation portion 95D disposed downstream relative to the alteration portion 94d. The differential pressure generation portions 95A, 95B, 95C, and 95D are check valves each configured to permit the hydraulic oil to flow from the pilot oil paths 45 to the alteration portions 94, as well as to prevent the hydraulic oil from flowing to the pilot oil paths 45. Although, in the embodiment, the plurality of differential pressure generation portions 95 are respectively disposed downstream relative to the plurality of alteration portions 94, the plurality of differential pressure generation portions 95 may respectively be disposed upstream relative to the plurality of alteration portions 94.

In the hydraulic system of the traveling system, when the operation member 54A is swung forward or backward, the travel pump 50A (travel motor 36L) can operate smoothly. Alternatively, when the operation member 54B is swung forward or backward, the travel pump 50B (travel motor 36R) can operate smoothly.

For descriptive purposes, as for the operation members 54A and 54B, one direction is referred to as "forward" ("F" in FIG. 1), and the other direction opposite to the one direction is referred to as "backward" ("B" in FIG. 1). The operation valves (operation valves 46A and 46C) disposed on a side, which respectively operate when the operation members 54A and 54B are operated in the one direction, are referred to as "first operation valves", and the operation valves (operation valves 46B and 46D) disposed on the other side, which respectively operate when the operation members 54A and 54B are respectively operated in the other direction, are referred to as "second operation valves".

The oil paths 45a and 45c respectively coupling the first pressure receiving portions 51a and 52a and the first operation valves 46A and 46C are referred to as "first pilot oil paths". The oil paths 45b and 45d respectively coupling the second pressure receiving portions 51b and 52b and the second operation valves 46B and 46D are referred to as "second pilot oil paths". The drain oil paths 91a and 91c respectively coupled to the first pilot oil paths 45a and 45c are referred to as "first drain oil paths". The drain oil paths 91b and 91d respectively coupled to the second pilot oil paths 45b and 45d are referred to as "second drain oil paths". The alteration portions 94a and 94c respectively disposed in the first drain oil paths 91a and 91c are referred to as "first alteration portions". The alteration portions 94b and 94d respectively disposed in the second drain oil paths 91b and 91d are referred to as "second alteration portions". The differential pressure generation portions 95A and 95C respectively disposed in the first drain oil paths 91a and 91c are referred to as "first differential pressure generation portions". The differential pressure generation portions 95B and 95D respectively disposed in the second drain oil paths 91b and 91d are referred to as "second differential pressure generation portions".

As illustrated in FIG. 1, when focused on the first pressure receiving portion 51a of the travel pump 50A, the drain oil path 91a is disposed in the first pilot oil path 45a coupling the first pressure receiving portion 51a and the first operation valve 46A, and the first alteration portion 94a and the first differential pressure generation portion 95A are disposed in the first drain oil path 91a. When focused on the second pressure receiving portion 51b of the travel pump 50A, the second drain oil path 91b is disposed in the second pilot oil path 45b coupling the second pressure receiving portion 51b and the second operation valve 46B, and the second alteration portion 94b and the second differential pressure generation portion 95B are disposed in the second drain oil path 91b.

Therefore, when the operation member 54A is swung forward (in the one direction) or backward (in the other direction) from a neutral position, within a predetermined range (e.g., dead zone) from the neutral position, the first differential pressure generation portion 95A or the second differential pressure generation portion 95B can limit the pilot oil to be drained from the first alteration portion 94a or the second alteration portion 94b. As a result, in an initial stage of the operation of the operation member 54A, first pressure representing the pilot pressure acting onto the first pressure receiving portion 51a of the travel pump 50A or second pressure representing the pilot pressure acting onto the second pressure receiving portion 51b can be raised. On the other hand, when the operation member 54A is swung forward or backward exceeding the predetermined range, the pilot oil drains from the first alteration portion 94a and the first differential pressure generation portion 95A or the second alteration portion 94b and the second differential pressure generation portion 95B. Therefore, an upper limit can be set for the secondary pilot pressure acting onto the travel pump 50A.

When focused on the first pressure receiving portion 52a of the travel pump 50B, the first drain oil path 91c is disposed in the first pilot oil path 45c coupling the first pressure receiving portion 52a and the first operation valve 46C, and the alteration portion 94c and the first differential pressure generation portion 95C are disposed in the first drain oil path 91c. When focused on the second pressure receiving portion 52b of the travel pump 50A, the second drain oil path 91d is disposed in the second pilot oil path 45d coupling the second pressure receiving portion 52b and the second operation valve 46D, and the alteration portion 94d and the second differential pressure generation portion 95D are disposed in the second drain oil path 91d.

Therefore, when the operation member 54B is swung forward (in the one direction) or backward (in the other direction) from a neutral position, within the predetermined range from the neutral position, the first differential pressure generation portion 95C or the second differential pressure generation portion 95D can limit the pilot oil to be drained from the first alteration portion 94c or the second alteration portion 94d. As a result, in an initial stage of the operation of the operation member 54B, first pressure representing the pilot pressure acting onto the first pressure receiving portion 52a of the travel pump 50B or second pressure representing the pilot pressure acting onto the second pressure receiving portion 52b can be raised. On the other hand, when the operation member 54B is swung forward or backward exceeding the predetermined range, the pilot oil drains from the first alteration portion 94c and the first differential pressure generation portion 95C or the second alteration portion 94d and the second differential pressure generation portion 95D. Therefore, an upper limit can be set for the secondary pilot pressure acting onto the travel pump 50B.

Figure 2A:
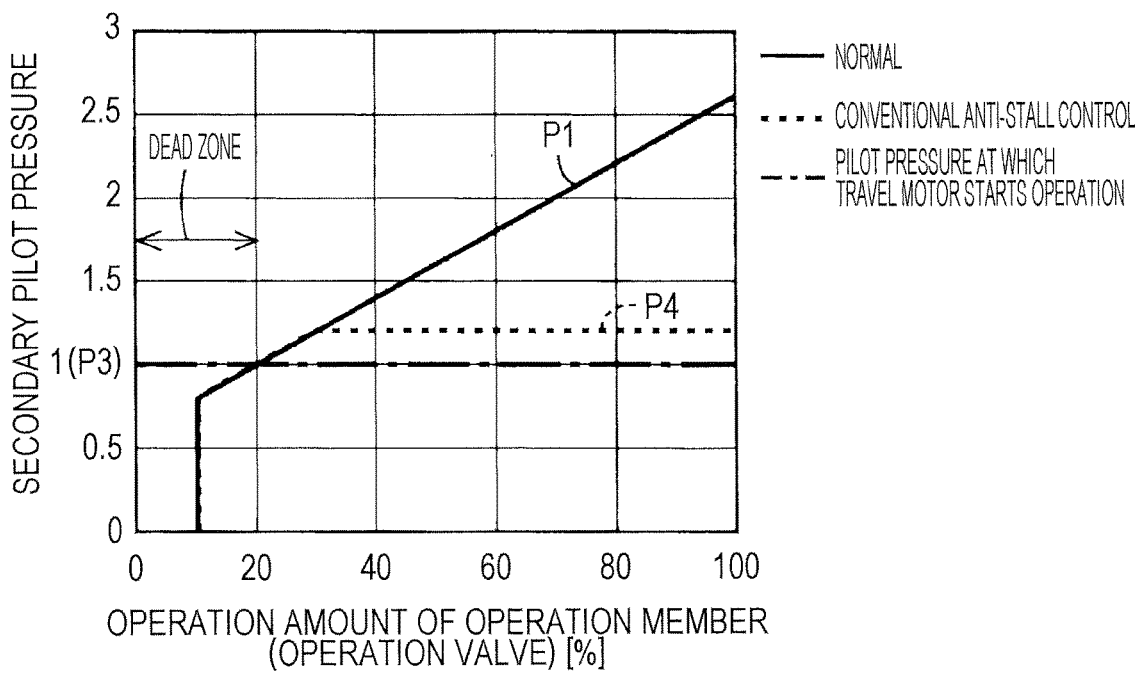
FIG. 2A is a graph of a relationship between an operation amount and pilot pressure.
Figure 2B:
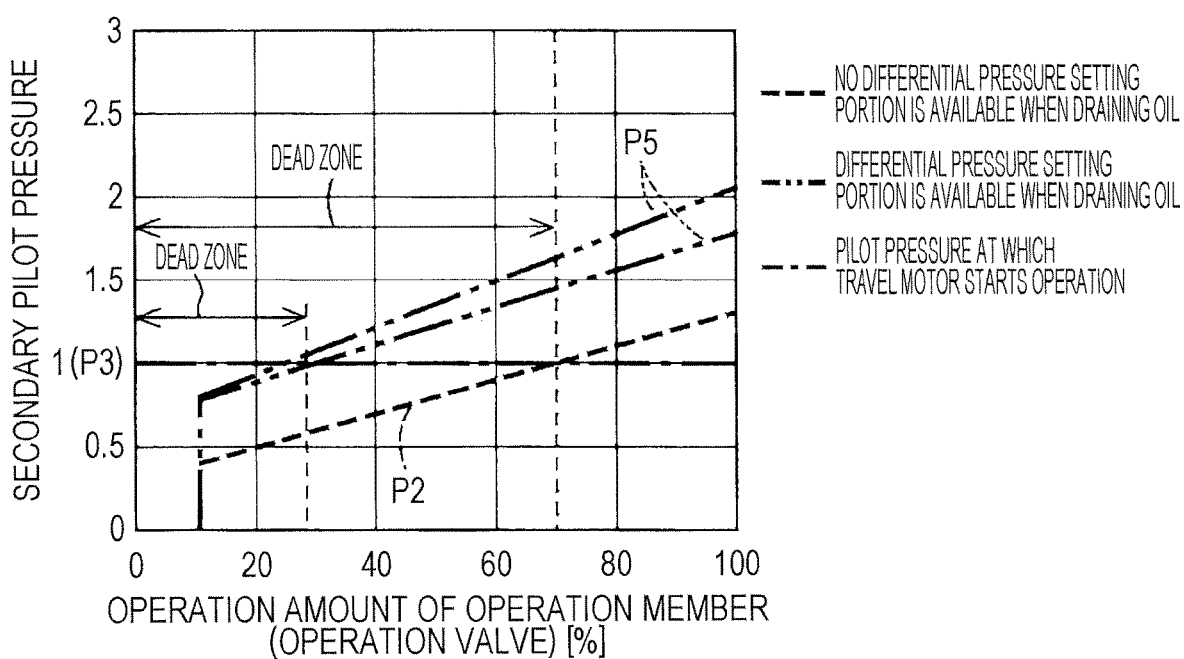
FIG. 2B is another graph of a relationship between an operation amount and pilot pressure.

FIGS. 2A and 2B are graphs each illustrating a relationship between an operation amount of an operation member (operation valve) and pilot pressure. The pilot pressure illustrated in FIGS. 2A and 2B represents the secondary pilot pressure (secondary pilot pressure acting onto the pressure receiving portions) in the first pilot oil paths 45a and 45c and the second pilot oil paths 45b and 45d. The pilot pressure illustrated in FIGS. 2A and 2B represents the pressure when throttle areas of the throttle portions 93a, 93b, 93c, and 93d respectively disposed in the plurality of pilot oil paths 45 and throttle areas of the alteration portions 94a, 94b, 94c, and 94c respectively disposed in the drain oil paths 91 are made identical to each other, and when an operation member 93 is operated. The pressure illustrated in FIGS. 2A and 2B is merely an example. The embodiment of the present invention is not limited to this pressure.

As illustrated in FIGS. 2A and 2B, when the secondary pilot pressure is not limited (when the pilot oil in the first pilot oil paths 45a and 45c and the second pilot oil paths 45b and 45d is not drained to the drain oil paths 91), pilot pressure (a pilot pressure/an additional pilot pressure) P1 reaches pilot pressure P3 required for operating the hydraulic actuators upon an operation amount exceeding 20%, switching control valves 20 and allowing the hydraulic actuators to start operating. After the operation amount exceeds approximately 20%, the pilot pressure P1 raises (increases) the secondary pilot pressure in accordance with the operation amount.

As can be seen conventionally, when an anti-stall event occurs to limit primary pilot pressure of pilot oil to be supplied to the operation valves, as illustrated in FIG. 2A, pilot pressure P4 reaches pilot pressure P3 upon an operation amount exceeding approximately 20%, switching the control valves 20 and allowing the hydraulic actuators to start operating. When primary pilot pressure is limited, as can be seen conventionally, upon an operation amount exceeding 30%, the secondary pilot pressure P4 becomes constant, lowering ease of operation.

As illustrated in FIG. 2B, when only the drain oil paths 91 and the alteration portions 94 are simply disposed in order to limit secondary pilot pressure (when the first differential pressure generation portions 95A and 95C and the second differential pressure generation portions 95B and 95D are not disposed), and when either of the operation members 54A and 54B is operated, neither pilot pressure P2 (P2 is an example of an adjusted pilot pressure/an adjusted additional pilot pressure) reaches pilot pressure P3, nor the control valves 20 switch, unless an operation amount exceeds approximately 70%. Therefore, ease of operation could lower.

As described above in the embodiment, in the hydraulic system in which the first differential pressure generation portions 95A and 95C and the second differential pressure generation portions 95B and 95D are disposed, when either of the operation members 54A and 54B is operated, as illustrated in FIG. 2B, secondary pilot pressure P5 can become approximately equal to or can exceed the pilot pressure P3 upon the operation amount exceeding approximately 30%, allowing the travel pumps 50 to supply the pilot oil and allowing the travel motors 36 and 36R to operate at a level almost identical to a normal level. It is preferable that differential pressure in the first differential pressure generation portions 95A and 95C and the second differential pressure generation portions 95B and 95D is set to pressure, i.e., P3, at which the travel pumps 50 start operating and a regulator operates.

As described above in the embodiment, the pilot pressure P5 can be altered with respect to an operation amount with the alteration portions 94 respectively by means of variable throttle valves, for example. For example, as illustrated in FIG. 2B, with the alteration portions 94, the gradient of the pilot pressure P5 (P5 is an example of an adjusted pilot pressure/an adjusted additional pilot pressure) can be altered. Therefore, even when an operation amount is within a predetermined range, secondary pilot pressure can be altered, achieving ease of operation in conformity to various situations.

Figure 3A:
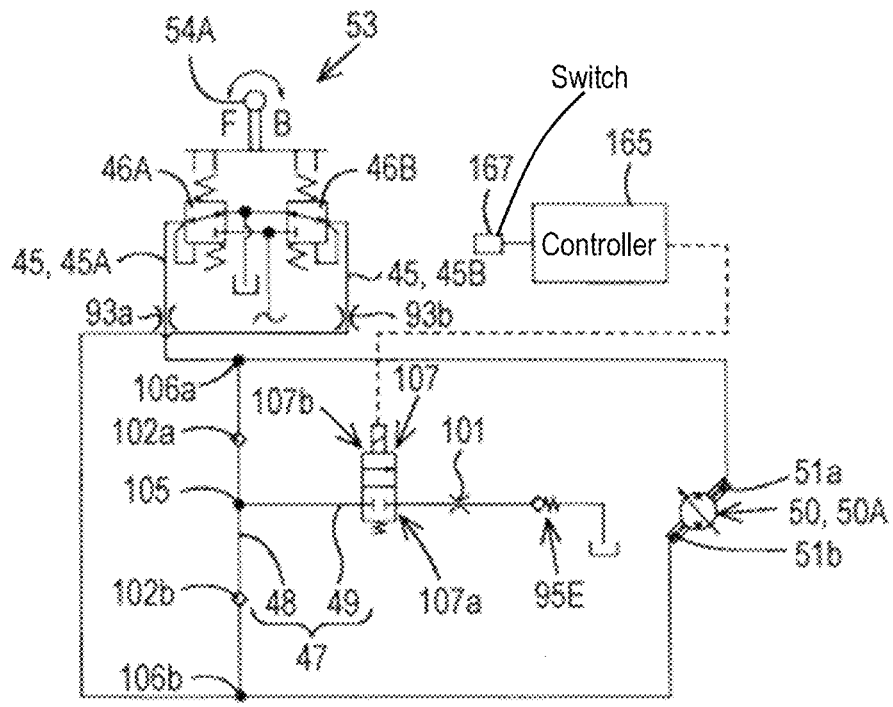
FIG. 3A is a view of a hydraulic system of a traveling system, according to a first modification.

FIGS. 3A to 3D illustrate modifications in which, in the hydraulic system of the traveling system, drain oil paths, throttle portions, and differential pressure generation portions, for example, are modified. Although FIG. 3A illustrates an example with modified drain oil paths, throttle portions, and differential pressure generation portions around the travel pump 50A, the example can be applied to another travel pump, such as the travel pump 50B. In FIG. 3A, other portions are configured identical to the hydraulic system according to the above described embodiment.

As illustrated in FIG. 3A, a drain oil path 47 includes a first coupling oil path 48 and a second coupling oil path 49. The first coupling oil path 48 is an oil path coupled to the first pilot oil path 45a and the second pilot oil path 45b. The second coupling oil path 49 is coupled to the first coupling oil path 48 to drain the hydraulic oil in the first coupling oil path 48 to a hydraulic oil tank, for example. In the second coupling oil path 49, a throttle portion 101 with a fixed throttle area (inner diameter) is disposed. A differential pressure generation portion 95E is disposed downstream relative to the throttle portion 101. The differential pressure generation portion 95E is a check valve configured to permit the hydraulic oil to drain from the first coupling oil path 48 via the second coupling oil path 49, and to prevent the hydraulic oil from flowing from the second coupling oil path 49, via the throttle portion 101, to the first coupling oil path 48.

In the first coupling oil path 48, a first check valve 102a and a second check valve 102b are disposed. The first check valve 102a is disposed between a coupling portion 105 coupling the first coupling oil path 48 and the second coupling oil path 49 and a coupling portion 106a coupling the first coupling oil path 48 and the first pilot oil path 45a. The first check valve 102a is configured to permit the hydraulic oil to flow from the first pilot oil path 45a to the second coupling oil path 49, and to prevent the hydraulic oil from flowing from the second coupling oil path 49 to the first pilot oil path 45a.

The second check valve 102b is disposed between the coupling portion 105 and a coupling portion 106b coupling the first coupling oil path 48 and the second pilot oil path 45b. The second check valve 102b is configured to permit the hydraulic oil to flow from the second pilot oil path 45b to the second coupling oil path 49, and to prevent the hydraulic oil from flowing from the second coupling oil path 49 to the second pilot oil path 45b.

In the first coupling oil path 48, between the differential pressure generation portion 95E and the coupling portion 105, a switching valve (a solenoid valve) 107 is disposed. The switching valve 107 is a valve configured to switch between a first position 107a that is an open position and a second position 107b that is a closed position. The switching valve 107 is switched by a switch 167 that is coupled to the controller 165, and that is configured to switch ON or OFF. The switch 167 is disposed adjacent to the driver's seat 8 so as to be operated by a driver, for example. When a driver operates the switch 167 to turn ON the switch 167, the controller 165 switches the switching valve 107 to the second position 107b. This can limit the secondary pilot pressure. In other words, the controller 165 receives the operation of the switch 167 (ON) to allow the solenoid valve (e.g. switching valve 107) to change the selected pressure (e.g., secondary pilot pressure) to the adjusted pilot pressure (e.g., pressure caused by the differential pressure generation portion 95E and the throttle portion 101) based on the operation of the switch 167. On the other hand, when the driver operates the switch 167 to turn OFF the switch 167, the controller 165 switches the switching valve 107 to the first position 107a. This can stop limiting of the secondary pilot pressure. In other words, the controller 165 receives the operation of the switch 167 (OFF) to disallow the solenoid valve (e.g., switching valve 107) to change the selected pressure (e.g., secondary pilot pressure) to the adjusted pilot pressure based on the operation of the switch 167.

Figure 3B:
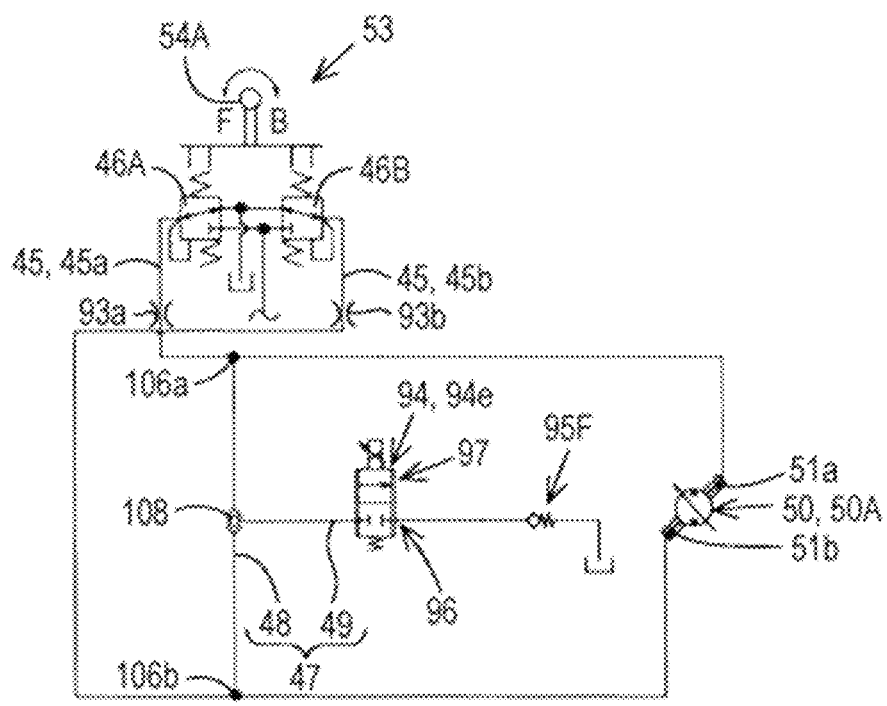
FIG. 3B is a view of a hydraulic system of a traveling system, according to a second modification.

As illustrated in FIG. 3B, in the first coupling oil path 48, a pressure selection valve 108 is disposed. The pressure selection valve 108 is configured to transmit, to the second coupling oil path 49, pilot pressure in the first pilot oil path 45a or the second pilot oil path 45b, in other words, pilot pressure acting onto the first pilot oil path 45a (in the first coupling oil path 48, between the coupling portion 106a and the pressure selection valve 108) or pilot pressure acting onto the second pilot oil path 45b (in the first coupling oil path 48, between the coupling portion 106b and the pressure selection valve 108), whichever higher.

In the second coupling oil path 49, an alteration portion 94e including a variable throttle portion is disposed. A differential pressure generation portion 95F including a check valve is disposed downstream relative to the alteration portion 94e.

Figure 3C:
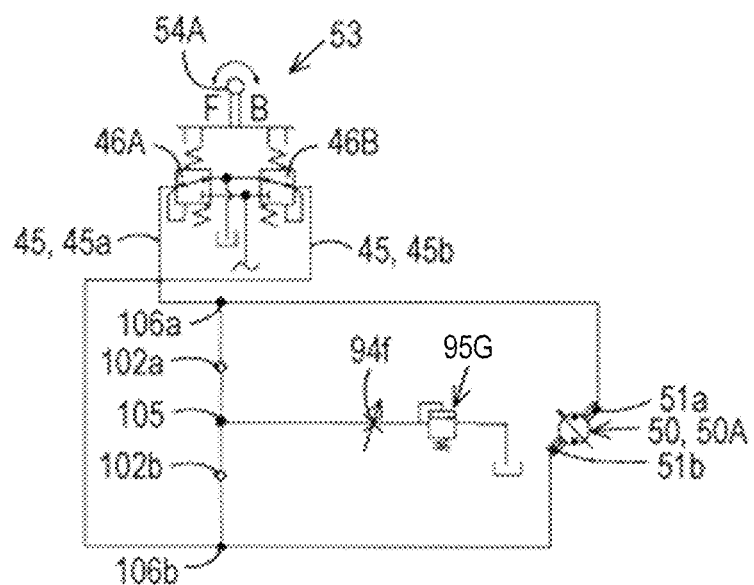
FIG. 3C is a view of a hydraulic system of a traveling system, according to a third modification.

As illustrated in FIG. 3C, in the second coupling oil path 49, an alteration portion 94f is disposed. The alteration portion 94f is a manual type variable throttle valve. A differential pressure generation portion 95G including a relief valve is disposed downstream relative to the alteration portion 94f.

Figure 3D:
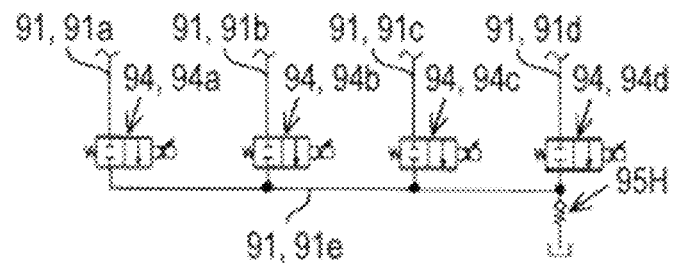
FIG. 3D is a view of a hydraulic system of a traveling system, according to a fourth modification.

As illustrated in FIG. 3D, the drain oil paths 91 include a plurality of drain oil paths 91a, 91b, 91c, 91c, 91d, and 91e. The drain oil path 91e is an oil path joining downstream sides of the other oil paths that are the drain oil paths 91a, 91b, 91c, and 91d. In the drain oil path 91e, a differential pressure generation portion 95H including a check valve is disposed.

Figure 5:
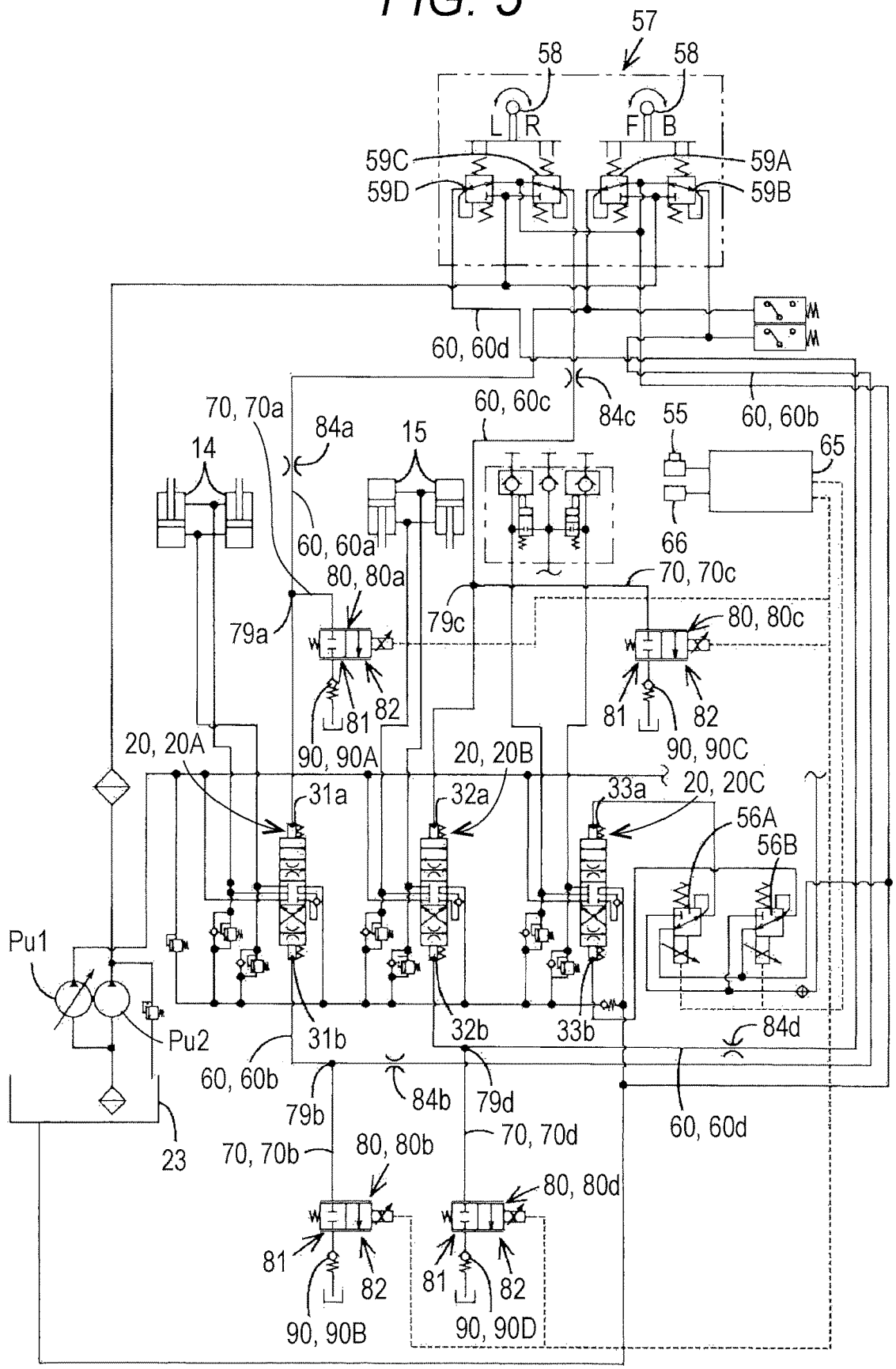
FIG. 5 is a view of a hydraulic system of a work system.

As illustrated in FIG. 5, the hydraulic system includes the first hydraulic pump Pu1 and the second hydraulic pump Pu2. The first hydraulic pump Pu1 is used to drive a hydraulic actuator of the boom cylinders 14, the bucket cylinders 15, or an attachment attached to the leading ends of the booms 22. The second hydraulic pump Pu2 (pilot pump) is mainly used to supply pressure of the hydraulic oil, which is to be used as control pressure or signal pressure. Hereinafter, for descriptive purposes, the hydraulic oil for supplying control pressure or signal pressure will be referred to as "pilot oil", while pressure of the pilot oil will be referred to as "pilot pressure".

The hydraulic system of the work system includes the plurality of control valves 20. The plurality of control valves 20 are valves respectively configured to control hydraulic actuators (work hydraulic actuators) in the work system. Specifically, the plurality of control valves 20 include a boom control valve 20A, a bucket control valve 20B, and an auxiliary control valve 20C. The first hydraulic pump Pu1 and the plurality of control valves 20 (boom control valve 20A, bucket control valve 20B, and auxiliary control valve 20C) are coupled with supply oil paths.

The boom control valve 20A is a valve configured to control the boom cylinders 14 that are work hydraulic actuators configured to operate the booms 10. The boom control valve 20A is a directly-operated spool type three-position switching valve. The boom control valve 20A includes a plurality of pressure receiving portions configured to receive pressure of the pilot oil. The plurality of pressure receiving portions include a first pressure receiving portion 31a and a second pressure receiving portion 31b. The first pressure receiving portion 31a is disposed in a main body (body) of the boom control valve 20A, and is a portion to which the pilot pressure acts when the pilot oil is supplied. The second pressure receiving portion 31b is disposed in the main body of the boom control valve 20A, and is a portion to which the pilot pressure acts when the pilot oil is supplied.

The bucket control valve 20B is a valve configured to control the bucket cylinders 15 that are work hydraulic actuators configured to operate the bucket 11. The bucket control valve 20B is a pilot-type, directly-operated spool type three-position switching valve. The bucket control valve 20B includes a plurality of pressure receiving portions configured to receive pressure of the pilot oil. The plurality of pressure receiving portions include a first pressure receiving portion 32a and a second pressure receiving portion 32b. The first pressure receiving portion 32a is disposed in a main body (body) of the bucket control valve 20B, and is a portion to which the pilot pressure acts when the pilot oil is supplied. The second pressure receiving portion 32b is disposed in the main body of the bucket control valve 20B, and is a portion to which the pilot pressure acts when the pilot oil is supplied.

The auxiliary control valve 20C is a valve configured to control auxiliary hydraulic actuators (including a hydraulic cylinder and a hydraulic motor) that are work hydraulic actuators configured to operate an auxiliary attachment. The auxiliary control valve 20C is a pilot-type, directly-operated spool type three-position switching valve. The auxiliary control valve 20C includes a plurality of pressure receiving portions configured to receive pressure of the pilot oil. The plurality of pressure receiving portions include a first pressure receiving portion 33a and a second pressure receiving portion 33b. The first pressure receiving portion 33a is disposed in a main body (body) of the auxiliary control valve 20C, and is a portion to which the pilot pressure acts when the pilot oil is supplied. The second pressure receiving portion 33b is disposed in the main body of the auxiliary control valve 20C, and is a portion to which the pilot pressure acts when the pilot oil is supplied.

The hydraulic system of the work system includes a work operation device 57. The work operation device 57 is a device configured to operate each of the plurality of control valves 20. When operated, the work operation device 57 can set pilot pressure acting onto the pressure receiving portions (first pressure receiving portions 31a and 32a and second pressure receiving portion 31b and 32b) of the control valves 20.

Specifically, the work operation device 57 includes an operation member 58, and a plurality of operation valves 59A, 59B, 59C, and 59D. The operation member 58 is formed into a lever, for example, and is configured to swing forward, backward, rightward, and leftward. The plurality of operation valves 59A, 59B, 59C, and 59D are coupled, via oil paths, to the second hydraulic pump Pu2, and are each configured to set pilot pressure in accordance with an operation of the operation member 58.

For example, when the operation member 58 is tilted forward, the operation valve 59A sets pilot pressure acting onto the first pressure receiving portion 31a in accordance with an operation amount of the operation member 58. When the pilot pressure acting onto the first pressure receiving portion 31a is equal to or above a predetermined value, the boom control valve 20A switches, the boom cylinders 14 contract, and the booms 10 lower.

When the operation member 58 is tilted backward, the operation valve 59B sets pilot pressure acting onto the second pressure receiving portion 31b in accordance with an operation amount of the operation member 58. When the pilot pressure acting onto the second pressure receiving portion 31b is equal to or above a predetermined value, the boom control valve 20A switches, the boom cylinders 14 extend, and the booms 10 rise.

When the operation member 58 is tilted rightward, the operation valve 59C sets pilot pressure acting onto the first pressure receiving portion 32a in accordance with an operation amount of the operation member 58. When the pilot pressure acting onto the first pressure receiving portion 32a is equal to or above a predetermined value, the bucket control valve 20B switches, the bucket cylinders 15 extend, and the bucket 11 performs a dump operation. When the operation member 58 is tilted leftward, the operation valve 59D sets pilot pressure acting onto the second pressure receiving portion 32b in accordance with an operation amount of the operation member 58. When the pilot pressure acting onto the second pressure receiving portion 32b is equal to or above a predetermined value, the bucket control valve 20B switches, the bucket cylinders 15 contract, and the bucket 11 performs a scoop operation.

The work operation device 57 includes a switch 55 in addition to the operation member 58 that is a lever, for example. The switch 55 is a slide switch configured to swing, for example. The switch 55 is coupled to a controller 65. By operating the switch 55, pilot pressure acting onto the pressure receiving portions (first pressure receiving portion 33a and second pressure receiving portion 33b) of the auxiliary control valve 20C can be set. Specifically, electromagnetic proportional valves 56A and 56B are coupled to the controller 65. When the switch 55 is swung in one direction, such as leftward, the electromagnetic proportional valve 56A changes its degree of opening in accordance with an operation amount of the switch 55. When the switch 55 is swung in another direction, such as rightward, the electromagnetic proportional valve 56B changes its degree of opening in accordance with an operation amount of the switch 55. As described above, by setting the electromagnetic proportional valves 55A and 55B via the switch 55, the pilot pressure acting onto the first pressure receiving portion 33a and the second pressure receiving portion 33b of the auxiliary control valve 20C can be altered. Therefore, the auxiliary control valve 20C can be switched.

The hydraulic system of the work system includes a plurality of pilot oil paths 60. The plurality of pilot oil paths 60 are oil paths respectively coupling the work operation device 57 and the plurality of pressure receiving portions (first pressure receiving portions 31a and 32a and second pressure receiving portions 31b and 32b). Specifically, the plurality of pilot oil paths 60 include a pilot oil path 60a coupling the operation valve 59A and the first pressure receiving portion 31a, a pilot oil path 60b coupling the operation valve 59B and the second pressure receiving portion 31b, a pilot oil path 60c coupling the operation valve 59C and the first pressure receiving portion 32a, and a pilot oil path 60d coupling the operation valve 59D and the second pressure receiving portion 32b.

The hydraulic system of the work system includes a plurality of drain oil paths 70. The plurality of drain oil paths 70 are oil paths respectively coupled to the plurality of pilot oil paths 60, and are configured to drain the pilot oil in the plurality of pilot oil paths 60 to the hydraulic oil tank 23, for example. Specifically, the plurality of drain oil paths 70 include a drain oil path 70a coupled to the pilot oil path 60a, a drain oil path 70b coupled to the pilot oil path 60b, a drain oil path 70c coupled to the pilot oil path 60c, and a drain oil path 70d coupled to the pilot oil path 60d.

In the plurality of pilot oil paths 60, throttle portions 84a, 84b, 84c, and 84d are respectively disposed between the plurality of operation valves 59A, 59B, 59C, and 59D and coupling portions 79a, 79b, 79c, and 79d respectively coupling the plurality of pilot oil paths 60 and the plurality of drain oil paths 70.

The hydraulic system of the work system includes a plurality of alteration portions (pressure adjustment valves) 80, and a plurality of differential pressure generation portions (differential pressure generation valves) 90. The plurality of alteration portions 80 are each configured to alter the pilot pressure (secondary pilot pressure) acting onto the pressure receiving portions (first pressure receiving portion 33a and second pressure receiving portion 33b) with respect to an operation amount of the work operation device 57, for example, when a load of the engine 9 is higher than a load threshold. In other words, the plurality of alteration portions 80 are each configured to at least alter an increasing rate (gradient) of the secondary pilot pressure with respect to an operation amount of the work operation device 57. The plurality of alteration portions 80 may each be configured to alter a decreasing rate (gradient) of the secondary pilot pressure with respect to an operation amount of the work operation device 57.

The plurality of alteration portions 80 are respectively disposed in the plurality of drain oil paths 70. The plurality of alteration portions 80 include an alteration portion 80a disposed in the drain oil path 70a, an alteration portion 80b disposed in the drain oil path 70b, an alteration portion 80c disposed in the drain oil path 70c, and an alteration portion 80d disposed in the drain oil path 70d.

The alteration portions 80a, 80b, 80c, and 80d are electromagnetic variable throttle valves (electric variable throttle valves). The variable throttle valves are valves each configured to switch between a closed position 81, at which a throttle area is reduced to zero, that is, the path is fully closed, and an open position 82, at which the path is fully open. The variable throttle valves are each configured to set a throttle area at a desired position between the closed position 81 and the open position 82.

A throttle amount of each of the variable throttle valves can be adjusted with a switch 66 disposed on the controller 65, for example. The switch 66 is disposed adjacent to the driver's seat 8 so as to be operated by a driver, for example. For example, the switch 66 is a switch configured to switch between ON and OFF. A signal indicative of ON or OFF of the switch 66 then is input to the controller 65. When the switch 66 is in ON, the pilot pressure in the plurality of pilot oil paths 60 (secondary pilot pressure in the operation valves 59A, 59B, 59C, and 59D) is limited, while, when the switch 66 is in OFF, no secondary pilot pressure is limited. For example, when the switch 66 is in ON, the controller 65 sets throttle amounts for the variable throttle valves so that throttle diameters (throttle areas) of the alteration portions 80 and throttle diameters of the throttle portions 84a, 84b, 84c, and 84d respectively match each other. On the other hand, when the switch 66 is in OFF, the controller 65 causes the variable throttle valves to each move to the closed position 81. By disposing an alteration operation member 68, which is a rotatable volume or a slide switch, for example, on the controller 65, and by operating the alteration operation member 68, an increasing rate (gradient) of secondary pilot pressure may be altered with respect to an operation amount of the work operation device 57. The above described throttle amounts set in the variable throttle valves are merely examples. The embodiment of the present invention is not limited to the throttle amounts.

The plurality of differential pressure generation portions 90 are respectively disposed in the plurality of drain oil paths 70. The plurality of differential pressure generation portions 90 are portions each configured to at least generate differential pressure upstream or downstream relative to the plurality of alteration portions 80.

The plurality of differential pressure generation portions 90 are respectively disposed downstream relative to the plurality of alteration portions 80. The plurality of differential pressure generation portions 90 include a differential pressure generation portion 90A disposed downstream relative to the alteration portion 80a, a differential pressure generation portion 90B disposed downstream relative to the alteration portion 80b, a differential pressure generation portion 90C disposed downstream relative to the alteration portion 80c, and a differential pressure generation portion 90D disposed downstream relative to the alteration portion 80d. The differential pressure generation portions 90A, 90B, 90C, and 90D are check valves each configured to permit the hydraulic oil to flow from the pilot oil paths 60 to the alteration portions 80, and to prevent the hydraulic oil from flowing to the pilot oil paths 60. Although, in the embodiment, the plurality of differential pressure generation portions 90 are respectively disposed downstream relative to the plurality of alteration portions 80, the plurality of differential pressure generation portions 90 may respectively be disposed upstream relative to the plurality of alteration portions 80.

In the hydraulic system of the work system, when the operation member 58 is swung forward or backward, the control valves 20 (work hydraulic actuators) can operate smoothly. Alternatively, when the operation member 58 is swung rightward or leftward, the control valves 20 (work hydraulic actuators) can operate smoothly.

For descriptive purposes, as for the operation member 58, one direction is referred to as "front or right", and the other direction opposite to the one direction is referred to as "back or left". The operation valves (operation valves 59A and 59C) disposed on a side, which respectively operate when the operation member 58 is operated in the one direction, are referred to as "first operation valves", and the operation valves (operation valves 59B and 59D) disposed on the other side, which respectively operate when the operation member 58 is operated in the other direction, are referred to as "second operation valves".

The oil paths 60a and 60c respectively coupling the first pressure receiving portions 31a and 32a and the first operation valves 59A and 59C are referred to as "first pilot oil paths". The oil paths 60b and 60d respectively coupling the second pressure receiving portions 31b and 32b and the second operation valves 59B and 59D are referred to as "second pilot oil paths". The drain oil paths 70a and 70c respectively coupled to the first pilot oil paths 60a and 60c are referred to as "first drain oil paths". The drain oil paths 70*b* and 70*d* respectively coupled to the second pilot oil paths 60*b* and 60*d* are referred to as "second drain oil paths". The alteration portions 80*a* and 80*c* respectively disposed in the first drain oil paths 70*a* and 70*c* are referred to as "first alteration portions". The alteration portions 80*b* and 80*d* respectively disposed in the second drain oil paths 70*b* and 70*d* are referred to as "second alteration portions". The differential pressure generation portions 90A and 90C respectively disposed in the first drain oil paths 70*a* and 70*c* are referred to as "first differential pressure generation portions". The differential pressure generation portions 90B and 90D respectively disposed in the second drain oil paths 70*b* and 70*d* are referred to as "second differential pressure generation portions".

As illustrated in FIG. 5, when focused on the first pressure receiving portion 31*a* of the boom control valve 20A, the drain oil path 70*a* is disposed in the first pilot oil path 60*a* coupling the first pressure receiving portion 31*a* and the first operation valve 59A, and the first alteration portion 80*a* and the first differential pressure generation portion 90A are disposed in the first drain oil path 70*a*. When focused on the second pressure receiving portion 31*b* of the boom control valve 20A, the second drain oil path 70*b* is disposed in the second pilot oil path 60*b* coupling the second pressure receiving portion 31*b* and the second operation valve 59B, and the second alteration portion 80*b* and the second differential pressure generation portion 90B are disposed in the second drain oil path 70*b*.

Therefore, when the operation member 58 is swung forward (in the one direction; "F" in FIG. 5) or backward (in the other direction; "B" in FIG. 5) from a neutral position, within a predetermined range (e.g., dead zone) from the neutral position, the first differential pressure generation portion 90A or the second differential pressure generation portion 90B can limit the pilot oil to be drained from the first alteration portion 80*a* or the second alteration portion 80*b*. As a result, in an initial stage of the operation of the operation member 58, first pressure representing the pilot pressure acting onto the first pressure receiving portion 31*a* of the boom control valve 20A or second pressure representing the pilot pressure acting onto the second pressure receiving portion 31*b* can be raised. On the other hand, when the operation member 58 is swung forward or backward exceeding the predetermined range, the pilot oil drains from the first alteration portion 80*a* and the first differential pressure generation portion 90A or the second alteration portion 80*b* and the second differential pressure generation portion 90B. Therefore, an upper limit can be set for the secondary pilot pressure acting onto the boom control valve 20A.

When focused on the first pressure receiving portion 32*a* of the bucket control valve 20B, the first drain oil path 70*c* is disposed in the first pilot oil path 60*e* coupling the first pressure receiving portion 32*a* and the first operation valve 59C, and the alteration portion 80*c* and the first differential pressure generation portion 90C are disposed in the first drain oil path 70*e*. When focused on the second pressure receiving portion 32*b* of the boom control valve 20A, the second drain oil path 70*d* is disposed in the second pilot oil path 60*d* coupling the second pressure receiving portion 32*b* and the second operation valve 59D, and the alteration portion 80*d* and the second differential pressure generation portion 90D are disposed in the second drain oil path 70*d*.

Therefore, when the operation member 58 is swung rightward (in the one direction; "R" in FIG. 5) or leftward (in the other direction; "L" in FIG. 5) from the neutral position, within a predetermined range from the neutral position, the first differential pressure generation portion 90C or the second differential pressure generation portion 90D can limit the pilot oil to be drained from the first alteration portion 80*c* or the second alteration portion 80*d*. As a result, in an initial stage of the operation of the operation member 58, first pressure representing the pilot pressure acting onto the first pressure receiving portion 32*a* of the bucket control valve 20B or second pressure representing the pilot pressure acting onto the second pressure receiving portion 32*b* can be raised. On the other hand, when the operation member 58 is swung rightward or leftward exceeding the predetermined range, the pilot oil drains from the first alteration portion 80*c* and the first differential pressure generation portion 90C or the second alteration portion 80*d* and the second differential pressure generation portion 90D. Therefore, an upper limit can be set for the secondary pilot pressure acting onto the bucket control valve 20B.

Figure 6A:
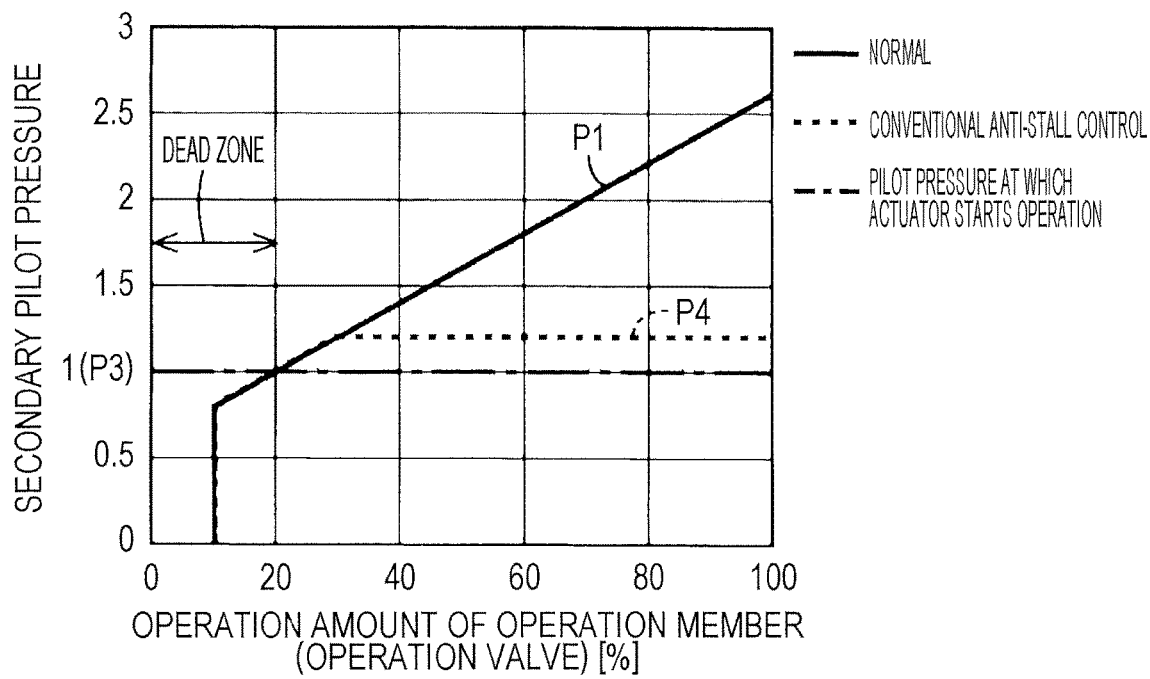
FIG. 6A is a graph of a relationship between an operation amount and pilot pressure.

FIGS. 6A and 2B are graphs each illustrating a relationship between an operation amount of an operation member (operation valve) and pilot pressure. The pilot pressure illustrated in FIGS. 6A and 2B represents the secondary pilot pressure (secondary pilot pressure acting onto the pressure receiving portions) in the first pilot oil paths 60*a* and 60*c* and the second pilot oil paths 60*b* and 60*d*. The pilot pressure illustrated in FIGS. 6A and 2B represents the pressure when throttle areas of the throttle portions 84*a*, 84*b*, 84*c*, and 84*d* respectively disposed in the plurality of pilot oil paths 60 and throttle areas of the alteration portions 80*a*, 80*b*, 80*c*, and 80*c* respectively disposed in the drain oil path 70 are made identical to each other, and when an operation member 84 is operated. The pressure illustrated in FIGS. 6A and 2B is merely an example. The embodiment of the present invention is not limited to this pressure.

As illustrated in FIG. 6A, when the secondary pilot pressure is not limited (when the pilot oil in the first pilot oil paths 60*a* and 60*c* and the second pilot oil paths 60*b* and 60*d* is not drained to the drain oil paths 70), pilot pressure P1 reaches pilot pressure P3 required for operating the hydraulic actuators upon an operation amount exceeding 20%, switching the control valves 20 and allowing the hydraulic actuators to start operating. After the operation amount exceeds approximately 20%, the pilot pressure P1 raises (increases) the secondary pilot pressure in accordance with the operation amount.

As can be seen conventionally, when an anti-stall event occurs to limit primary pilot pressure of pilot oil to be supplied to the operation valves, as illustrated in FIG. 6A, pilot pressure P4 reaches pilot pressure P3 upon an operation amount exceeding approximately 20%, switching the control valves 20 and allowing the hydraulic actuators to start operating. When primary pilot pressure is limited, as can be seen conventionally, upon an operation amount exceeding 30%, the secondary pilot pressure P4 becomes constant, lowering ease of operation.

Figure 6B:
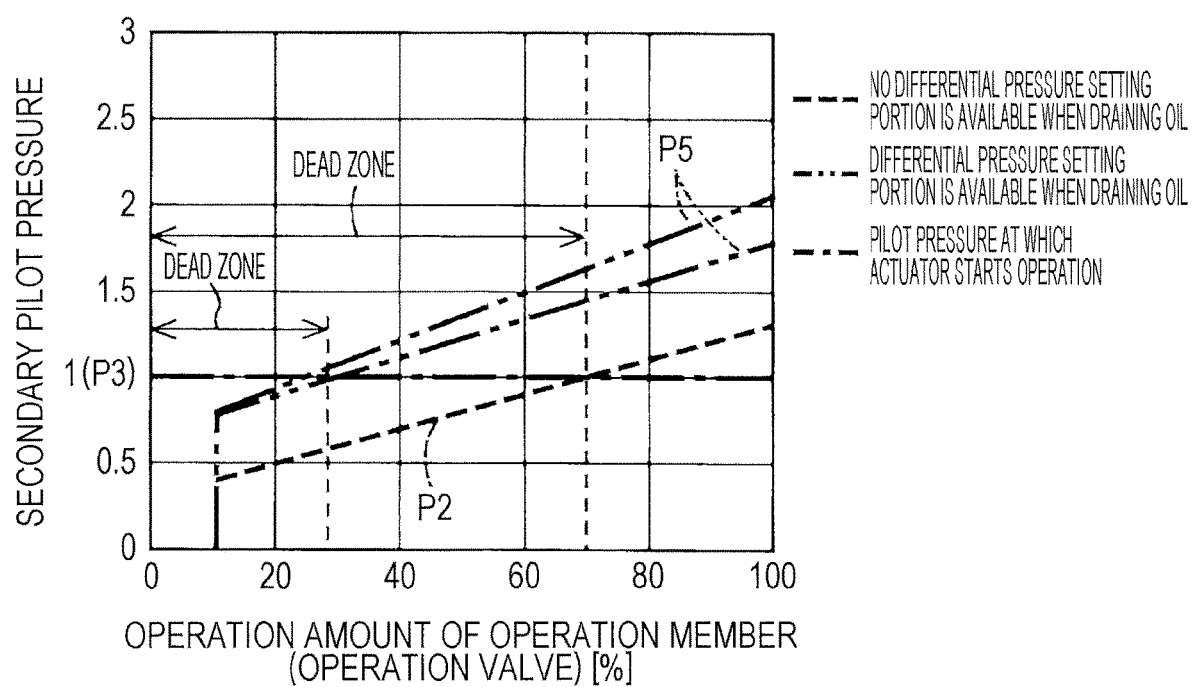
FIG. 6B is another graph of a relationship between an operation amount and pilot pressure.

As illustrated in FIG. 6B, when only the drain oil paths 70 and the alteration portions 80 are simply disposed in order to limit secondary pilot pressure (when the first differential pressure generation portions 90A and 90C and the second differential pressure generation portions 90B and 90D are not disposed), and when the operation member 58 is operated, neither pilot pressure P2 reaches pilot pressure P3, nor the control valves 20 switch, unless an operation amount exceeds approximately 70%. Therefore, ease of operation could lower.

On the other hand, as described above in the embodiment, in the hydraulic system in which the first differential pressure generation portions 90A and 90C and the second differential pressure generation portions 90B and 90D are disposed, when the operation member 58 is operated, as illustrated in FIG. 6B, secondary pilot pressure P5 can become approximately equal to or can exceed the pilot pressure P3 upon an operation amount exceeding approximately 30%, switching the control valves 20 and allowing the hydraulic actuators to operate at a level almost identical to a normal level. It is preferable that differential pressure in the first differential pressure generation portions 90A and 90C and the second differential pressure generation portions 90B and 90D is set to pilot pressure P3, i.e., pressure at which the control valves 20 start switching from the neutral position and the spools move.

As described above in the embodiment, the pilot pressure P5 can be altered with respect to an operation amount with the alteration portions 80 respectively by means of variable throttle valves, for example. For example, as illustrated in FIG. 6B, with the alteration portions 80, the gradient of the pilot pressure P5 can be altered. Therefore, even when an operation amount is within a predetermined range, secondary pilot pressure can be altered, achieving ease of operation in conformity to various situations.

Figure 7A:
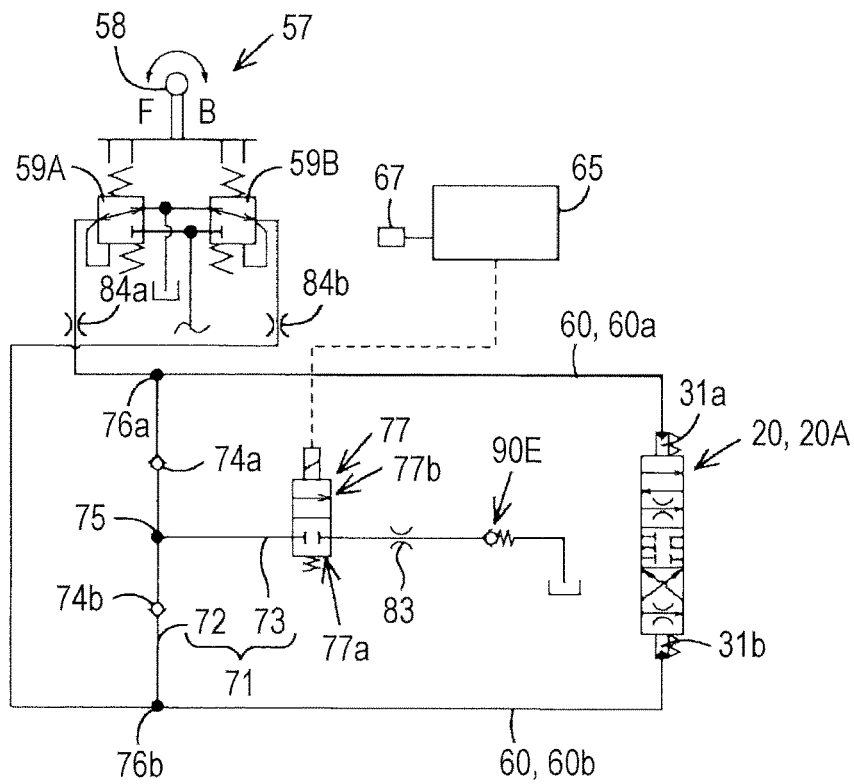
FIG. 7A is a view of a hydraulic system of a work system, according to a first modification.

FIGS. 7A to 7D illustrate modifications in which, in the hydraulic system of the work system, drain oil paths, throttle portions, and differential pressure generation portions, for example, are modified. Although FIG. 7A illustrates an example with modified drain oil paths, throttle portions, and differential pressure generation portions around the boom control valve 20A, the example can be applied to another control valve. In FIG. 7A, other portions are configured identical to the hydraulic system according to the above described embodiment.

As illustrated in FIG. 7A, a drain oil path 71 includes a first coupling oil path 72 and a second coupling oil path 73. The first coupling oil path 72 is an oil path coupled to the first pilot oil path 60a and the second pilot oil path 60b. The second coupling oil path 73 is coupled to the first coupling oil path 72 to drain the hydraulic oil in the first coupling oil path 72 to a hydraulic oil tank, for example. In the second coupling oil path 73, a throttle portion 83 with a fixed throttle area (inner diameter) is disposed. A differential pressure generation portion 90E is disposed downstream relative to the throttle portion 83. The differential pressure generation portion 90E is a check valve configured to permit the hydraulic oil to drain from the first coupling oil path 72 via the second coupling oil path 73, and to prevent the hydraulic oil from flowing from the second coupling oil path 73, via the throttle portion 83, to the first coupling oil path 72.

In the first coupling oil path 72, a first check valve 74a and a second check valve 74b are disposed. The first check valve 74a is disposed between a coupling portion 75 coupling the first coupling oil path 72 and the second coupling oil path 73 and a coupling portion 76a coupling the first coupling oil path 72 and the first pilot oil path 60a. The first check valve 74a is configured to permit the hydraulic oil to flow from the first pilot oil path 60a to the second coupling oil path 73, and to prevent the hydraulic oil from flowing from the second coupling oil path 73 to the first pilot oil path 60a.

The second check valve 74b is disposed between the coupling portion 75 and a coupling portion 76b coupling the first coupling oil path 72 and the second pilot oil path 60b. The second check valve 74b is configured to permit the hydraulic oil to flow from the second pilot oil path 60b to the second coupling oil path 73, and to prevent the hydraulic oil from flowing from the second coupling oil path 73 to the second pilot oil path 60b.

In the first coupling oil path 72, between the differential pressure generation portion 90E and the coupling portion 75, a switching valve 77 is disposed. The switching valve 77 is a valve configured to switch between a first position 77a that is a closed position and a second position 77b that is an open position. The switching valve 77 is switched by a switch 67 that is coupled to the controller 65, and that is configured to switch ON or OFF. The switch 67 is disposed adjacent to the driver's seat 8 so as to be operated by a driver, for example. When a driver operates the switch 67 to turn ON the switch 67, the controller 65 switches the switching valve 77 to the second position 77b. This can limit the secondary pilot pressure. On the other hand, when the driver operates the switch 67 to turn OFF the switch 67, the controller 65 switches the switching valve 77 to the first position 77a. This can stop limiting of the secondary pilot pressure.

Figure 7B:
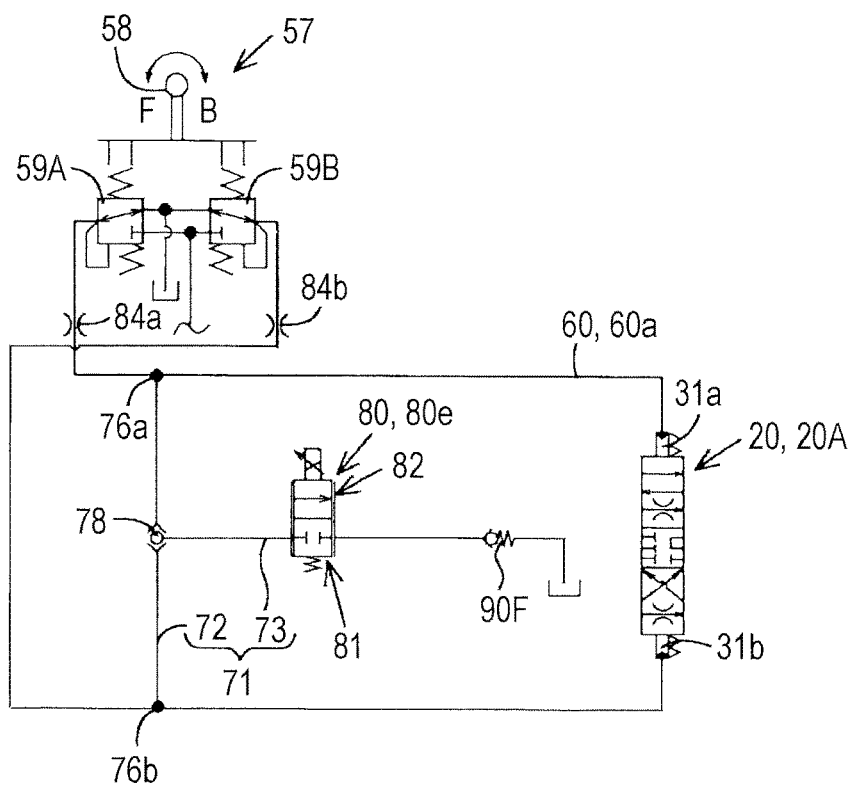
FIG. 7B is a view of a hydraulic system of a work system, according to a second modification.

As illustrated in FIG. 7B, in the first coupling oil path 72, a pressure selection valve 78 is disposed. The pressure selection valve 78 is configured to transmit, to the second coupling oil path 73, pilot pressure in the first pilot oil path 60a or the second pilot oil path 60b, in other words, pilot pressure acting onto the first pilot oil path 60a (in the first coupling oil path 72, between the coupling portion 76a and the pressure selection valve 78) or pilot pressure acting onto the second pilot oil path 60b (in the first coupling oil path 72, between the coupling portion 76b and the pressure selection valve 78), whichever higher.

In the second coupling oil path 73, an alteration portion 80e including a variable throttle valve is disposed. A differential pressure generation portion 90F including a check valve is disposed downstream relative to the alteration portion 80e.

Figure 7C:
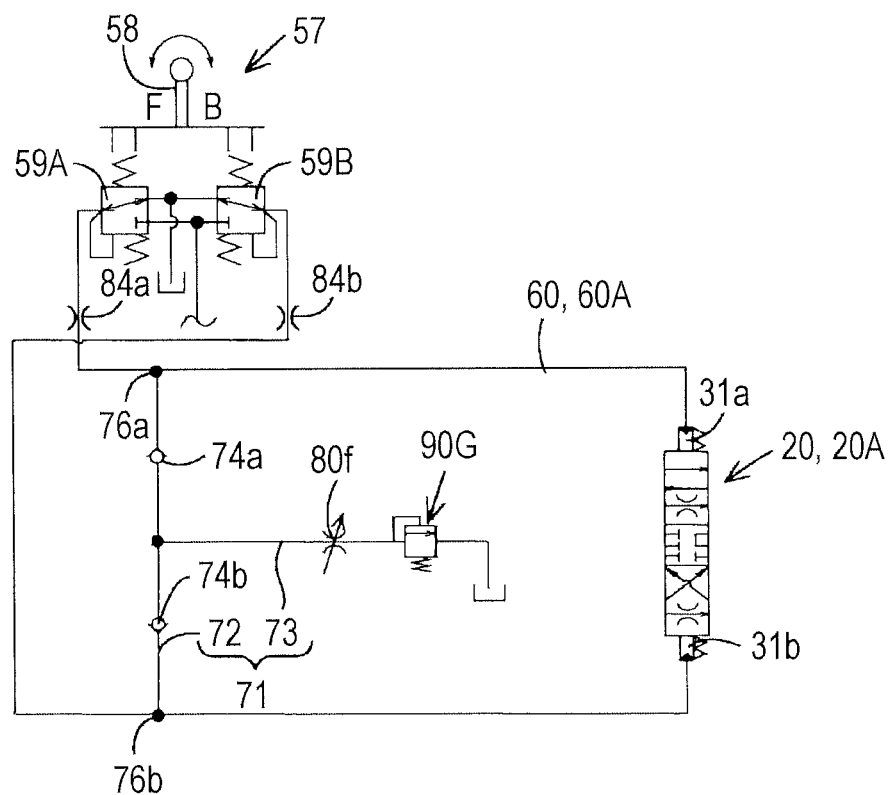
FIG. 7C is a view of a hydraulic system of a work system, according to a third modification.

As illustrated in FIG. 7C, in the second coupling oil path 73, an alteration portion 80f is disposed. The alteration portion 80f is a manual type variable throttle valve. A differential pressure generation portion 90G including a relief valve is disposed downstream relative to the alteration portion 80f.

Figure 7D:
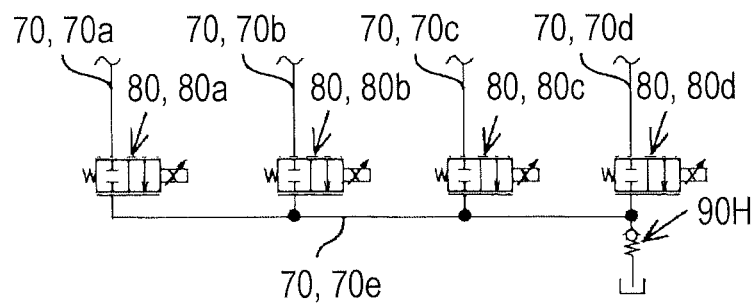
FIG. 7D is a view of a hydraulic system of a work system, according to a fourth modification.

As illustrated in FIG. 7D, the drain oil paths 70 include a plurality of drain oil paths 70a, 70b, 70c, 70c, 70d, and 70e. The drain oil path 70e is an oil path joining downstream sides of the other oil paths that are the drain oil paths 70a, 70b, 70c, and 70d. In the drain oil path 70e, a differential pressure generation portion 90H including a check valve is disposed.

The embodiments disclosed herein are given only for illustration and should not be construed as being restrictive. The scope of the present invention is defined by the claims, not by the above description, and intended to include all modifications within a gist and a scope equivalent to those of the claims. The differential pressure generation portions 90 and 95 may respectively be either check valves or relief valves.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic system in a work machine, comprising:
   a travel motor to be driven by hydraulic oil to rotate a drive shaft of a travel machine of the work machine;
   a travel pump to supply the hydraulic oil to the travel motor to drive the travel motor;

a hydraulic pump to supply pilot hydraulic oil;
a pilot oil path connecting the hydraulic pump and the travel pump to supply the pilot hydraulic oil to the travel pump;
a travel operation device provided in the pilot oil path between the hydraulic pump and the travel pump and including an operation member, the travel operation device being configured to generate a pilot pressure and an additional pilot pressure in accordance with an operation amount of the operation member, the pilot pressure being supplied via the pilot oil path;
an additional pilot oil path connecting the travel operation device and the travel pump to supply the additional pilot pressure to the travel pump, the travel pump being configured to control a flow direction of the hydraulic oil supplied to the travel motor based on the pilot pressure and the additional pilot pressure;
a drain oil path divided from the pilot oil path, the drain oil path comprising:
  a first coupling oil path connecting the pilot oil path and the additional pilot oil path; and
  a second coupling oil path divided from the first coupling oil path;
a pressure selection valve provided in the first coupling oil path to select a selected pressure of the pilot hydraulic oil from the pilot pressure and the additional pilot pressure to apply the selected pressure to the pilot hydraulic oil in the second coupling oil path;
a pressure adjustment valve provided in the second coupling oil path to control the selected pressure to be an adjusted pilot pressure, the pressure adjustment valve being an electromagnetic valve;
a switch operable by a driver; and
a controller configured to receive an operation of the switch and electrically connected to the pressure adjustment valve to allow the pressure adjustment valve to change the selected pressure to the adjusted pilot pressure and to disallow the pressure adjustment valve to change the selected pressure to the adjusted pilot pressure based on the operation of the switch,
wherein the operation member is an operation lever configured to be operated in a first direction and a second direction; and
wherein the travel operation device includes:
  a first operation valve connected to the pilot oil path to supply the pilot pressure of the pilot hydraulic oil to the travel pump when the operation lever is operated in the first direction; and
  a second operation valve connected to the additional pilot oil path to supply the additional pilot pressure of the pilot hydraulic oil when the operation lever is operated in the second direction.

2. The hydraulic system according to claim 1, further comprising:
a first throttle provided in the pilot oil path between the travel operation device and the drain oil path; and
a second throttle provided in the additional pilot oil path between the travel operation device and the first coupling oil path.

3. The hydraulic system according to claim 1, further comprising:
a differential pressure generation valve provided in the second coupling oil path to generate differential pressure upstream or downstream relative to the pressure adjustment valve.

4. The hydraulic system according to claim 3, wherein the differential pressure generation valve includes a check valve.

5. The hydraulic system according to claim 1,
wherein the pressure adjustment valve includes a variable throttle valve.

6. The hydraulic system according to claim 1,
wherein the drain oil path is coupled to a connection of the additional pilot oil path between the travel operation device and the travel pump, the connection being upstream with respect to the pressure adjustment valve in the drain oil path.

7. The hydraulic system according to claim 1,
wherein the travel pump includes a pressure receiver, and
wherein the pilot oil path connects the travel operation device and the pressure receiver of the travel pump to supply the pilot pressure to the pressure receiver.

8. The hydraulic system according to claim 1,
wherein the travel pump includes a pressure receiver and an additional pressure receiver,
wherein the pilot oil path connects the first operation valve and the pressure receiver of the travel pump to supply the pilot pressure to the pressure receiver, and
wherein the additional pilot oil path connects the second operation valve and the additional pressure receiver of the travel pump to supply the additional pilot pressure to the additional pressure receiver.

9. The hydraulic system according to claim 1, wherein the pressure adjustment valve controls the selected pressure to be the adjusted pilot pressure when a driver turns on the switch that is disposed adjacent to a driver's seat.

10. The hydraulic system according to claim 1, wherein the pressure adjustment valve is configured to control the pilot pressure such that an increasing rate of the adjusted pilot pressure with respect to an operation amount of the operation member is different from an increasing rate of the pilot pressure with respect to the operation amount of the operation member.

11. The hydraulic system according to claim 1, wherein the pressure adjustment valve is configured to control the pilot pressure such that an decreasing rate of the adjusted pilot pressure with respect to an operation amount of the operation member is different from an decreasing rate of the pilot pressure with respect to the operation amount of the operation member.

12. A hydraulic system in a work machine, comprising:
a travel motor to be driven by hydraulic oil to rotate a drive shaft of a travel machine of the work machine;
a travel pump to supply the hydraulic oil to the travel motor to drive the travel motor;
a hydraulic pump to supply pilot hydraulic oil;
a pilot oil path connecting the hydraulic pump and the travel pump to supply the pilot hydraulic oil to the travel pump;
a travel operation device provided in the pilot oil path between the hydraulic pump and the travel pump and including an operation member, the travel operation device being configured to generate a pilot pressure and an additional pilot pressure in accordance with an operation amount of the operation member, the pilot pressure being supplied via the pilot oil path;
an additional pilot oil path connecting the travel operation device and the travel pump to supply the additional pilot pressure to the travel pump, the travel pump being configured to control a flow direction of the hydraulic oil supplied to the travel motor based on the pilot pressure and the additional pilot pressure;

a drain oil path divided from the pilot oil path, the drain oil path comprising:
- a first coupling oil path connecting the pilot oil path and the additional pilot oil path; and
- a second coupling oil path divided from the first coupling oil path;

a first check valve provided in the first coupling oil path to be opened such that the pilot hydraulic oil flows from the pilot oil path to the second coupling oil path and to be closed such that the pilot hydraulic oil does not flow from the second coupling oil path to the pilot oil path;

a second check valve provided in the first coupling oil path to be opened such that the hydraulic oil flows from the additional pilot oil path to the second coupling oil path and to be closed such that the pilot hydraulic oil does not flow from the second coupling oil path to the additional pilot oil path;

a solenoid valve provided in the second coupling oil path to control the pilot pressure to be an adjusted pilot pressure and to control the additional pilot pressure to be an adjusted additional pilot pressure;

a switch operable by a driver; and a controller configured to receive an operation of the switch and electrically connected to the solenoid valve to allow the solenoid valve to change the selected pressure to the adjusted pilot pressure and to disallow the solenoid valve to change the selected pressure to the adjusted pilot pressure based on the operation of the switch, wherein the operation member is an operation lever configured to be operated in a first direction and a second direction; and wherein the travel operation device includes:
- a first operation valve connected to the pilot oil path to supply the pilot pressure of the pilot hydraulic oil to the travel pump when the operation lever is operated in the first direction; and
- a second operation valve connected to the additional pilot oil path to supply the additional pilot pressure of the pilot hydraulic oil when the operation lever is operated in the second direction.

13. The hydraulic system according to claim 12, further comprising:
- a first throttle provided in the pilot oil path between the travel operation device and the drain oil path; and
- a second throttle provided in the additional pilot oil path between the travel operation device and the first coupling oil path.

14. The hydraulic system according to claim 12, further comprising:
- a differential pressure generation valve provided in the second coupling oil path to generate differential pressure upstream or downstream relative to the solenoid valve.

15. The hydraulic system according to claim 14, wherein the differential pressure generation valve includes a check valve.

16. The hydraulic system according to claim 12,
wherein the drain oil path is coupled to a connection of the additional pilot oil path between the travel operation device and the travel pump, the connection being upstream with respect to the solenoid valve in the drain oil path.

17. The hydraulic system according to claim 12,
wherein the travel pump includes a pressure receiver, and
wherein the pilot oil path connects the travel operation device and the pressure receiver of the travel pump to supply the pilot pressure to the pressure receiver.

18. The hydraulic system according to claim 12,
wherein the travel pump includes a pressure receiver and an additional pressure receiver,
wherein the pilot oil path connects the first operation valve and the pressure receiver of the travel pump to supply the pilot pressure to the pressure receiver, and
wherein the additional pilot oil path connects the second operation valve and the additional pressure receiver of the travel pump to supply the additional pilot pressure to the additional pressure receiver.

19. The hydraulic system according to claim 12, wherein the solenoid valve controls the pilot pressure to be the adjusted pilot pressure and controls the additional pilot pressure to be an adjusted additional pilot pressure when a driver turns on the switch that is disposed adjacent to a driver's seat.

20. A hydraulic system in a work machine, comprising:
- a travel motor to be driven by hydraulic oil to rotate a drive shaft of a travel machine of the work machine;
- a travel pump to supply the hydraulic oil to the travel motor to drive the travel motor;
- a hydraulic pump to supply pilot hydraulic oil;
- a pilot oil path connecting the hydraulic pump and the travel pump to supply the pilot hydraulic oil to the travel pump;
- a travel operation device provided in the pilot oil path between the hydraulic pump and the travel pump and including an operation member, the travel operation device being configured to generate a pilot pressure and an additional pilot pressure in accordance with an operation amount of the operation member, the pilot pressure being supplied via the pilot oil path;
- an additional pilot oil path connecting the travel operation device and the travel pump to supply the additional pilot pressure to the travel pump, the travel pump being configured to control a flow direction of the hydraulic oil supplied to the travel motor based on the pilot pressure and the additional pilot pressure;
- a drain oil path divided from the pilot oil path, the drain oil path comprising:
  - a first coupling oil path connecting the pilot oil path and the additional pilot oil path; and
  - a second coupling oil path divided from the first coupling oil path;
- a valve arrangement including one of:
  - a pressure selection valve provided in the first coupling oil path to select a selected pressure of the pilot hydraulic oil from the pilot pressure and the additional pilot pressure to apply the selected pressure to the pilot hydraulic oil in the second coupling oil path; and
  - a first check valve and a second check valve both being provided in the first coupling oil path, the first check valve being configured to be opened such that the pilot hydraulic oil flows from the pilot oil path to the second coupling oil path and to be closed such that the pilot hydraulic oil does not flow from the second coupling oil path to the pilot oil path, the second check valve being configured to be opened such that the hydraulic oil flows from the additional pilot oil path to the second coupling oil path and to be closed such that the pilot hydraulic oil does not flow from the second coupling oil path to the additional pilot oil path;

a pressure adjustment valve provided in the second coupling oil path to control the selected pressure to be an adjusted pilot pressure, the pressure adjustment valve being an electromagnetic valve;

a switch operable by a driver;

a controller configured to receive an operation of the switch and electrically connected to the pressure adjustment valve to allow the pressure adjustment valve to change the selected pressure to the adjusted pilot pressure and to disallow the pressure adjustment valve to change the selected pressure to the adjusted pilot pressure based on the operation of the switch;

a differential pressure generation valve provided in the second coupling oil path downstream relative to the pressure adjustment valve and configured to generate differential pressure upstream or downstream relative to the pressure adjustment valve; and a hydraulic oil tank provided in the second coupling oil path downstream relative to the pressure adjustment valve and the differential pressure generation valve, wherein the operation member is an operation lever configured to be operated in a first direction and a second direction; and wherein the travel operation device includes:
- a first operation valve connected to the pilot oil path to supply the pilot pressure of the pilot hydraulic oil to the travel pump when the operation lever is operated in the first direction; and
- a second operation valve connected to the additional pilot oil path to supply the additional pilot pressure of the pilot hydraulic oil when the operation lever is operated in the second direction.

* * * * *